United States Patent
Feins et al.

(10) Patent No.: US 12,354,496 B2
(45) Date of Patent: Jul. 8, 2025

(54) COLORECTAL AND PELVIC SURGICAL SIMULATION MODEL SYSTEMS AND METHODS

(71) Applicant: Intuitive Surgical Operations, Inc., Sunnyvale, CA (US)

(72) Inventors: Richard Feins, Chapel Hill, NC (US); John Alexander, Chapel Hill, NC (US); Samuel D. Drew, Chapel Hill, NC (US); Joanna Cao, Chapel Hill, NC (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 763 days.

(21) Appl. No.: 17/576,022

(22) Filed: Jan. 14, 2022

(65) Prior Publication Data
US 2022/0223070 A1    Jul. 14, 2022

Related U.S. Application Data

(60) Provisional application No. 63/143,527, filed on Jan. 29, 2021, provisional application No. 63/137,434, filed on Jan. 14, 2021.

(51) Int. Cl.
*G09B 23/30* (2006.01)
*G09B 23/28* (2006.01)

(52) U.S. Cl.
CPC ......... *G09B 23/306* (2013.01); *G09B 23/303* (2013.01); *G09B 23/285* (2013.01)

(58) Field of Classification Search
CPC ....... G09B 23/28; G09B 23/30; G09B 23/306
See application file for complete search history.

(56) References Cited

U.S. PATENT DOCUMENTS

| | | | |
|---|---|---|---|
| 5,792,135 A | 8/1998 | Madhani et al. | |
| 5,817,084 A | 10/1998 | Jensen | |
| 6,331,181 B1 | 12/2001 | Tierney et al. | |
| 6,441,577 B2 | 8/2002 | Blumenkranz et al. | |
| 6,491,701 B2 | 12/2002 | Tierney et al. | |
| 6,817,974 B2 | 11/2004 | Cooper et al. | |
| 7,544,062 B1 * | 6/2009 | Hauschild | G09B 23/285 434/272 |
| 7,963,913 B2 | 6/2011 | Devengenzo et al. | |
| 8,911,238 B2 * | 12/2014 | Forsythe | G09B 23/28 434/267 |
| 9,940,849 B2 * | 4/2018 | Hart | G09B 23/285 |

(Continued)

OTHER PUBLICATIONS

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

*Primary Examiner* — Kurt Fernstrom
(74) *Attorney, Agent, or Firm* — ALLEN, DYER, DOPPELT, + GILCHRIST, P.A.

(57) ABSTRACT

A custom support structure and models for use in simulated robotically-assisted, telesurgical and/or laparoscopic colonic, pelvic, bladder, or uterine surgery are disclosed. The support structure comprises components for inserting the support structure into a mannequin, and for positioning animal tissue in a way that mimics the human colorectal, pelvic, uterine, and bladder systems, thus allowing for simulated surgery.

25 Claims, 13 Drawing Sheets

(56) References Cited

U.S. PATENT DOCUMENTS

| | | | |
|---|---|---|---|
| 9,990,862 B2 * | 6/2018 | Choi | G09B 23/306 |
| 10,706,743 B2 * | 7/2020 | Black | G09B 23/34 |
| 10,847,057 B2 * | 11/2020 | Felsinger | G09B 23/30 |
| 11,302,219 B2 * | 4/2022 | Fernandez | G09B 23/30 |
| 11,645,951 B2 * | 5/2023 | Park | G09B 23/306 |
| | | | 434/272 |
| 11,847,932 B2 * | 12/2023 | Alexander | G09B 23/285 |
| 2008/0293026 A1 * | 11/2008 | Senagore | G09B 23/285 |
| | | | 434/262 |

* cited by examiner

Colorectal Model Vascular Components

X-Section of Iliac Artery

X-Section of Rectal Canal

COLORECTAL AND PELVIC SURGICAL SIMULATION MODEL SYSTEMS AND METHODS

FIELD

Aspects of the present disclosure relate to surgical simulator systems and methods for practicing and training on surgical procedures and techniques without risk to live humans or animals. The present disclosure further relates to a simulated model for minimally invasive surgical methods and techniques, such as robotically assisted or laparoscopic colorectal and pelvic surgical methods and techniques.

BACKGROUND

A significant gap presently exists between box-lap (i.e., laparoscopic trainers that are present in a box, that typically include artificial tissue, but have minimal realism, virtual-reality simulators, and live surgery. There are significant downsides to using live animal and cadaver models, particularly now, when many available cadavers may be contaminated, for example, with SARS-CoV-2, the causative agent for Covid-19.

It would be advantageous to have the ability to simulate robotically-assisted and/or laparoscopic colorectal and pelvic surgeries, in order for surgeons to be able to practice and train for surgical procedures on a simulated model rather than learning on a live human patient. However, on information and belief, use of animal tissue to simulate human anatomy for training on colorectal procedures can be difficult as animal colorectal and pelvic anatomy is significantly different than human anatomy. As a result, using the colorectal and pelvic anatomy of animals as existing in nature may provide limited utility for training surgeons on procedures for humans. This contrasts with the porcine heart and lungs which are similar in size and structure to human anatomy, i.e., simulations using porcine heart and lungs can be accomplished using the intact organ because of the anatomic similarities.

It would be advantageous to have improved models for use in training surgeons for colorectal and pelvic techniques and procedures. The present disclosure provides such an improved model, for use in simulated minimally invasive surgical methods and techniques, such as robotically assisted and laparoscopic colorectal, pelvic, bladder, and uterine surgical methods.

SUMMARY

In one embodiment, a custom support structure for use in simulated telesurgical, robotically-assisted and/or laparoscopic colorectal surgery is disclosed. In another embodiment, a model for use in simulated robotically-assisted and/or laparoscopic colon, uterine, pelvic and bladder surgery is disclosed. The model includes a support structure on which tissue is provided, where the tissue mimics the anatomy of the human colon, uterus, pelvis, and/or bladder.

The support structure comprises a caudad and a cephalad end, and left and right side walls. The support structure is appropriately sized to simulate the human abdominal cavity, and some variance in size can be present, to allow support structures to be used to simulate surgery on smaller or larger individuals.

In one aspect of this embodiment, the pelvic portions on the support structure are shaped to reproduce the angles found in a human pelvis, for example, by shaping the material that forms the support structure, such as a thermoplastic material, or adding tissue/filler to recreate the desired shape.

In one aspect of this embodiment, the support structure is formed of a thermoplastic material, such as Kydex, which can allow for rapid molding, and sufficient rigidity for use in simulated surgical models.

A suspended support, such as a hoop, or, more accurately, a part of a hoop, not the entire circle, is present at the caudad end, which suspended support extends from the left side to the right side of the support structure and is positioned above a U-shaped canal, and is connected to both of the side walls. In use, the suspended support is used to suspend tissue, such as a piece of muscle from the thinned down pork belly, to simulate an inferior abdominal wall. Clips, zip ties, sutures, or other mechanical means, as well as glue, caulk, and the like, can be used to adhere muscle to the suspended support.

In some embodiments, there are one or more holes at the bottom and/or sides of the support structure to allow for attachment of the completed simulated model for practicing simulated colorectal, pelvic, bladder, and uterine laparoscopic and/or robotically-assisted surgeries into the simulated abdominal cavity of a mannequin.

A rim (e.g., made of tubing) near the caudad end, which extends all or substantially all of the width of the support structure, is used to simulate a pelvic brim. The rim is positioned at or near where a surgeon would anticipate the pelvic brim being located in the human anatomy.

A "U" shaped component is present at or near the caudad end, and this component has holes at or near the top of each side of the "U", to allow for later insertion of a tissue block including part of the rectum, and, optionally, the bladder, urethra and/or uterus, sandwiched in muscle, into the "U" shape. After the tissue block is inserted into the "U", open ends of the "U" are brought together (e.g., tied) at the top to create a circle (a "canal"), which compresses that tissue. Accordingly, this "U" shaped component allows one to engage in training for mobilizing the rectum from the walls of the rectal canal in a confined space.

In another embodiment, a cassette for use in simulated robotically-assisted and/or laparoscopic colorectal, pelvic, bladder, and/or uterine surgery is disclosed. The cassette comprises the support structure, and sufficient animal and/or synthetic tissue, organs, and/or organ blocks to simulate robotically-assisted and/or laparoscopic colorectal, pelvic, bladder, and/or uterine surgery. The cassette can be inserted into a mannequin with an appropriately sized abdominal cavity, or other manifestation of an appropriately sized abdominal cavity.

In some embodiments, the tissue, organs, and/or organ systems are sourced in multiple components, from multiple animals. By way of a non-limiting example of a pelvic surgical model, the left colon, uterus, bladder, urethra, rectum, muscle, and abdominal wall can be sourced from one animal, or multiple animals. In a further non-limiting example of a colorectal surgical model, the left colon, uterus, small bowel, transverse colon with omentum, liver, spleen, rectum, muscle, and abdominal wall can be sourced from one animal, or multiple animals.

In one aspect of this embodiment, the colorectal or pelvic surgery model is based on porcine tissue blocks that include, on the support structure, a portion of pig abdominal wall thinned out to between 0.5 and 2" in thickness, covering all or substantially all of the bottom and the side walls of the Kydex support structure, adhered to the support structure (for example, using zip ties, sutures and/or adhesive).

An aorta runs down the middle of the pig belly, and is roughly positioned in the middle of the support structure.

The support structure comprises a rim (e.g., made of a piece of tubing) running perpendicular to the aorta across the width of the support structure, to simulate a pelvic brim. The aorta is bifurcated approximately 2 cm above the simulated pelvic brim.

Optionally, a pair of ureters can be placed on the pork belly, each within one to two inches of each side of the aorta, and extend all or substantially all of the entire length of the aorta and along its respective branches (i.e., each ureter follows the bifurcation). In some embodiments, the ureters extend down toward, and in some cases to, the inferior extent of the cassette.

In the colorectal model, a sandwich of muscle and rectum, which ideally comprises at least 50% of the original mesentery from the animal from which it was obtained, is laid into the canal and physically and/or chemically adhered into place (for example, using sutures and/or adhesives) onto the pig belly at the caudal end of the support structure. A simulated human colon prepared by coupling a porcine left colon, and an inverted porcine left colon, to form a transverse colon, is adhered to the belly to the north of the sandwich of the muscle and rectum along the left lateral wall. In some embodiments, three segments of the left colon are used to form the equivalent of the right, transverse, and left colon, and in these embodiments, the right and transverse colon are referred to herein as a simulated right or transverse colon, or an equivalent of a right or transverse colon. In some embodiments, the left colon and right colon equivalent are be adhered to lateral walls of the cassette.

In the pelvic model, a sandwich of muscle surrounding a uterus, rectum, and urethra, which ideally comprises at least 50% of the original mesentery from the animal from which it was obtained, is laid into the canal and physically and/or chemically adhered into place (for example, using sutures and/or adhesives) onto the pig belly at the caudal end of the support structure. A porcine left colon, terminating at the cephalad end at the sigmoid colon, and at the caudad end at or near the anus, is adhered to the belly to the north of the sandwich of the muscle, urethra, uterus, and rectum along the left lateral wall.

In the colorectal model, the model includes Component 1, which includes some form of biological tubing, whether from ureters, blood vessels, and the like, connected to a "Y" adaptor, such that there are three separate tubes, where Component 1 is adhered, through the aorta and into the mesentery, on the left colon. This component is optional in the pelvic model. In one embodiment, the vessels do not form a continuous loop. In another embodiment, the vessels form a continuous loop.

In the colorectal model, Component 2, which also includes some form of biological tubing, whether from ureters, blood vessels, and the like, connected to a "Y" adaptor, such that there are three separate tubes, where Component 2 is adhered, through the aorta and into the mesentery, on the simulated right colon. Component 1, at one end on the left side goes to the rectum and the other side toward the spleen, and Component 2 at one end comes out of the aorta at the top, with one tube going to the spleen and connecting to the other portion from Component 1 that exited the spleen, and the third tube going in the mesentery along the right colon, looping back and connecting to the aorta.

In the pelvic model, in those embodiments where Component 1 is present, a perfusion tube, originating from a perfusion bag, can come up through the aorta and is connected at one of the ends to one of the three tubes in Component 1.

In the colorectal model, a first perfusion tube, originating from a perfusion bag comes up through the aorta and is connected at one of the ends to one of the three tubes in Component 1, and a second perfusion tube, originating from a perfusion bag, comes up through the aorta and is connected to one of the three tubes in Component 2. In one embodiment, the second perfusion comes up to the proximal right colon (or equivalent thereof, prepared from the left colon) and then superiorly along the right colon or equivalent thereof to the midpoint of the transverse colon, or equivalent thereof, where it connects to the end of Component 1.

In either model, the perfusion tubes are connected at the other end to quick-connect or other suitable adaptors so that they can be connected to a pump, IV, or other source of simulated blood, so as to simulate perfusion of "blood" through the model.

In one embodiment, the "blood" does not actually perfuse the tissue. The perfusion tube and Component 1 in the pelvic model, and the perfusion tube, Component 1 and Component 2 in the colorectal model, are dead-end conduits with no tissue outlets. However, one or more balloons can be present in the aorta/iliac arteries. When the balloons are inflated and deflated, ideally at a rate that mirrors a physiologic heart rate, the aortic/iliac arteries expand and contract, simulating a pulse in those vessels. Once the compression is relieved, fluid in the vascular structures returns to its initial position and the cycle can be repeated. The resulting visual effect simulates perfusion.

The mesentery can be adhered to the lateral pork belly and to the aorta.

In the pelvic model, optionally, a portion of small bowel comprising two ends, and comprising mesentery, can be secured to the pork belly, connected at one of the ends to the ascending colon (large bowel, or, in the human, the caecum), to simulate a terminal ileum, and at the other end, connects to the pork belly to the left of the aorta. In one embodiment, porcine lymph nodes are attached to the aorta and iliac vessels to allow for lymph node dissection.

In the colorectal model, a portion of tissue resembling a duodenum is adhered to the pork belly toward the right of the aorta. A portion of small bowel comprising two ends, and comprising mesentery, is secured to the pork belly, connected at one of the ends to the ascending colon (large bowel, or, in the human, the caecum), to simulate a terminal ileum, and at the other end, connects to the pork belly to the left of the aorta. One branch of the Component 2 vascular configuration simulates the ileocolic blood supply to the terminal ileum, allowing for a surgeon to practice ligation of this vessel as would occur in surgical removal of the right colon.

In some embodiments, the colorectal model includes a portion of the descending colon coming up through the pelvis, and past the spleen.

In some embodiments, the colorectal model further comprises a piece of bowel adhered to the right lateral wall to simulate the ascending bowel.

In some embodiments, the pelvic and colorectal models further comprise a portion of pig abdominal wall muscle adhered to the caudal end of the pork belly, which is passed over and held in place on the suspended support, for example, using clips, zip ties, and the like. In one aspect of this embodiment, the muscle folds backward, and is covered on its under surface with pericardium. The muscle forms a shelf, and the shelf is used to seal off the end of the pelvic and/or colorectal models and provide a background.

In other embodiments, the pelvic and colorectal models further comprise one or more intraluminal balloons placed inside the aorta, to allow for simulation of pulsation of the aorta and the proximal iliac arteries as the one or more balloons are inflated and deflated. The model can further include a means for inflating and deflating the one or more balloons, such as a pulsatile pump.

The model can further comprise an IV bag filled with simulated blood, connected to one or both of first and second perfusion tubes. A pump can be used to move fluid through the perfusion tubes. In this manner, the cassette can be used in methods of simulating vessel sealing exercises, wherein one or more blood vessels in the surgical system are surgically mobilized, and the physician can practice sealing the vessel, for example, using sutures, staples, and/or electrocautery.

In any of the embodiments described herein, the cassette can also include a native porcine aorta (descending aorta), and used in methods of simulating aortic pulsation without perfusing blood, by placing a balloon in the porcine aorta, and inflating and deflating the balloon at a rate of between about 60 and about 80 times per minute.

In some embodiments, the colorectal model further comprises all or a portion of a liver and/or a spleen attached to the pork belly in an anatomically correct position, i.e., a position corresponding to where a liver and/or spleen would normally be present in the human anatomy.

In any of the embodiments described herein, the surgical simulation system can include, along with the cassette and the mannequin in which the cassette is placed, a disposable plastic bag placed beneath the tissue block and support structure prior to placement in the mannequin to allow for easy cleanup and tissue disposal.

Further, in any of the embodiments described herein, the surgical simulation system can include along with the cassette and the mannequin in which the cassette is placed, a silicone drape placed inside the mannequin to simulate the retroperitoneal background and improve fidelity during use of the model.

Still further, in any of the embodiments described herein, the anterior abdominal wall can be constructed so as to allow for laparoscopic or robotic surgical training.

The model can be stored, for example, in a vacuum bag. In some embodiments, the model is stored in an aqueous alcoholic solution, such as a 10-50% volume/volume solution of ethyl or isopropyl alcohol.

In some embodiments, the tissue blocks are mounted in a human mannequin, and perfused with real and/or artificial/simulated blood. In other aspects, the tissue blocks are not perfused with real or simulated blood, but rather, a pulse is simulated mechanically, for example, by positioning a balloon in an appropriate position within the aorta, and inflating and deflating the balloon. To mimic a "normal" pulse, for example, the balloon can be inflated and deflated at a rate of between about 60 and about 80 times per minute.

Accordingly, in some aspects, the cassette is substantially devoid of real or artificial blood, and in others, the biological tissue is adapted to be able to allow for "blood" to run though non-permeable tubes (such as ureters) simulating a vessel in the human that would function to perfuse blood.

In some aspects, the simulated anatomic framework is a silicone model of the abdominal cavity, and/or the cassette can be adapted for insertion into the simulated abdominal cavity of a mannequin.

In one aspect, a film of a salt/hydrogel solution overlies all or part of the biological tissue, allowing the surgeon to practice electrocautery.

In one aspect of this embodiment, the cassettes are packaged in a vacuum sealed bag, and the biological tissue is preserved using an alcohol-based preservative, such as an aqueous alcoholic solution including between around 10 and around 50% ethanol or isopropyl alcohol.

These cassettes can be used in a surgeon training apparatus that includes the cassettes, and a mannequin, where the cassettes are inserted into the mannequin, and used in methods for simulating robotic or laparoscopic colorectal, pelvic, bladder, and/or uterine surgery. In some embodiments, at the caudal end of the support structure, the rectum can be accessed by the surgeon, and surgery can proceed.

The present disclosure will be better understood with reference to the following detailed description.

DETAILED DESCRIPTION

Figure 1:
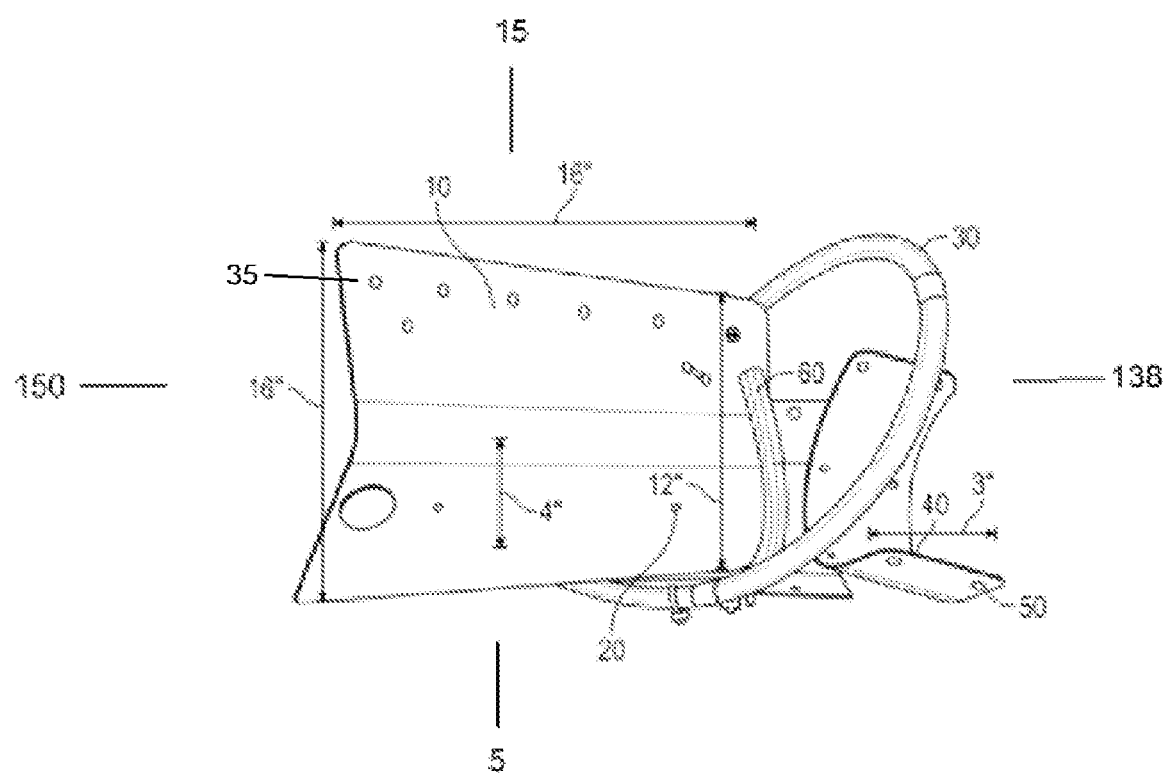
FIG. 1 is a schematic illustration of a support structure, in this embodiment for use in preparing some embodiments of the simulation model for laparascopic or robotically-assisted colorectal, pelvic, bladder, and/or uterine surgical methods and techniques described herein.

The models and methods described herein enable a surgeon to practice and train on colon, pelvic, uterine, and bladder surgical procedures and techniques, using laparoscopic and/or robotically assisted surgical tools.

Simulated robotically assisted and/or laparoscopic surgery using the models and methods described herein enable the surgeon to learn and practice the unique aspects of doing surgery using minimally invasive techniques without a risk to live humans or animals.

Open surgery is where each surgeon starts to learn surgery. Access is via a relatively large opening which enables a near full range of attack angles, open visualization, and direct tactile feedback for the surgeon to accomplish the procedure. However, in minimally invasive procedures using laparoscopic or robotically-assisted tools, the surgical tools must be inserted into the body via natural orifices or small surgical incisions (known as ports) and then positioned near the anatomical features of interest. If the ports are incorrectly positioned for a given procedure, there is a risk that the procedure may be hindered or unable to be accomplished. In addition, minimally invasive procedures involve use of different visualization and tactile feedback methods than open surgery as the small incisions limit natural visualization and direct tactile feedback of the anatomical features of interest. The simulation models described herein are designed to replicate the anatomic spatial geometry that the surgeon will face clinically, and enable surgeons to train on the various aspects of minimally invasive surgery, such as port placement, use of minimally invasive visualization, and differences in tactile feedback as well as other aspects. Such ability to train on minimally invasive surgery for colorectal, pelvic, bladder, and/or uterine procedures and techniques is a valuable aspect of the simulation models described herein.

One aspect of the models described herein is that they include actual biologic tissue, ideally configured to replicate human anatomy, even if it is not human tissue. The simulator models described herein enable surgeons to train and practice skills and techniques using the surgical tools to manipulate the real tissue. Learning how to effectively manipulate tissue in within the body without requiring large incisions is an important surgical aspect of learning the capabilities of minimally invasive surgery. The tissue used in the models described herein has texture and performance characteristics very similar to tissue surgeons will see during live surgery. The simulation models described herein enable surgeons to practice the surgical techniques they will encounter in actual surgery, such as dissecting, cutting, suturing, knot tying against tissue, cauterization, dividing and controlling blood vessels, and the like.

The real biologic tissue, organs, and/or organ systems used in the models can be divided into two types. The biologic tissue, organs, and/or organ systems may be made primarily of porcine tissue. However, the scope of the disclosure is not limited thereto or thereby, and other types of animal tissue may be used, such as bovine pericardium. Where the natural tissue substantially mimics human tissue, the tissue can be unaltered or minimally altered, then positioned into an anatomic frame so that they mimic clinical anatomy. Where the tissue does not substantially mimic human tissue, anatomic regions are reconfigured so as the simulate the target human anatomy. This is opposed to the use of actual porcine organs like the colon or small bowel.

By way of example, with respect to the pelvic model, the vasculature to the colon can be mimicked using Component 1, whereas in the colorectal model, Component 1 and Component 2 are used.

By way of example, with respect to the colorectal model, a pig does not have a straight right colon, so to provide a lifelike real-tissue model that mimics the structure of a human ascending colon, transverse colon, and descending colon, in some embodiments, a simulated human right and transverse colon is designed using left colon portions of a pig and selectively and strategically attaching the left and (simulated) right colon portions to an inverted left colon portion.

As described in more detail below, the models described herein comprise two basic parts, a biologic tissue portion and a support structure (e.g., a frame) for supporting the tissue. The frame may be sized to represent a specific anatomic region of the human body, such as, the abdominal canal, from the diaphragm to the rectum. A removable support structure, which in some embodiments is relatively small carrier plastic frame, (which, when tissue is adhered to the support structure, is referred to as a "cassette", is used for mounting the relevant biologic anatomy to the frame. The removable carrier with a mounted anatomical portion is positioned into the larger frame, such as a mannequin, in anatomically correct positions.

The cassette, which includes the removable support structure and mounted anatomical portions, allow the target anatomy to be exchanged, facilitating the learner to repeat aspects of the procedure progressing toward competence. For example, the removable carriers may be quickly and easily removed and replaced to allow surgeons to repeatedly practice the same procedure or skills to improve proficiency.

The models described herein therefore enable an anatomically realistic simulation of a complete robotic or laparoscopic procedure. Preferred port placement and surgical tool manipulation of realistic target anatomy are possible. An additional feature of the models described herein is that cassette can be removed from the model and examined. The learner can evaluate in real time the result of his or her work, which facilitates learning.

In various aspects of the simulated colorectal, pelvic, bladder, and/or uterine surgical model described herein, the model comprises one or more of the following features.

The present disclosure will be better understood with reference to the drawings. The individual components of the models are discussed in more detail below.

I. The Support Structure

FIG. 1 is a schematic illustration of a support structure (10) of a simulation model for colorectal, pelvic, bladder, and/or uterine surgery according to some embodiments. As described above, the support structure is configured to support the weight and models and to enable anatomically correct positioning of the model in a life-like human representation.

In some embodiments, as depicted in FIG. 1, the support structure is in the form of a custom support structure for use in simulated robotically-assisted and/or laparoscopic colorectal, pelvic, bladder, and/or uterine surgery is disclosed. The support structure comprises a caudad (138) and a cephalad end (150), and left (5) and right (15) side walls. A series of holes (35 and 20) are present to attach the support structure to a mannequin, and/or to attach additional components to the support structure. The support structure is appropriately sized to simulate the human abdominal cavity, and some variance in size can be present, to allow support structure to be used to simulate surgery on smaller or larger individuals.

In one aspect of this embodiment, the pelvic portions on the support structure are shaped to reproduce the angles found in a human pelvis, for example, by shaping the material that forms the support structure, such as a thermoplastic material, or adding tissue/filler to recreate the desired shape.

A suspended support (30) is present at the caudad end, which suspended support extends from the left side to the right side of the support structure and is positioned above a U-shaped canal (40), and the suspended support is connected to both of the side walls. In use, the suspended support is used to suspend tissue to simulate an inferior abdominal wall of a human. In some embodiments, the suspended tissue may include a piece of muscle from a thinned down pork belly.

In one embodiment, the suspended support, such as a hoop, is collapsible. This set-up allows for flat packaging of the cassette (i.e., the support structure plus the tissue, organs or organ blocks adhered/affixed to the support structure) in a vacuum-sealed bag. The combined use of an alcohol-based preservative allows for preservation, storage, shipping and easy placement into the mannequin.

In some embodiments, there are one or more holes at the bottom and/or sides of the support structure (30) to allow for attachment of the completed simulated model into the simulated abdominal cavity of a mannequin.

A rim near the caudad end (60), which extends all or substantially all of the width of the support structure, is used to simulate a pelvic brim. The rim may be made of tubing, and the rim is positioned at or near where a surgeon would anticipate the pelvic brim being located in the human anatomy.

A "U" shaped component (50) is present at or near the caudad end, and this component has holes at or near the top of each side of the "U" (60), to allow for later insertion of a tissue block including part of the rectum, the urethra, the bladder, and the uterus, sandwiched in muscle, into the "U" shape. After the tissue block is inserted into the "U", open ends of the "U" are brought together (e.g., tied) at the top to create a circle (a "canal"), which compresses that tissue.

The pelvic portions of the support structure can be shaped to reproduce the angles found in a human pelvis (either by shaping the plastic or adding tissue/filler to recreate the shape).

In one embodiment, the support structure shown in FIG. 1 is formed from Kydex, though any suitable material can be used, such as a thermoplastic material that can support the tissue/organs that, combined with the support structure, form the cassettes described herein. The support structure can be used to prepare one embodiment of the simulation model for laparascopic or robotic colorectal, pelvic, bladder, and/or uterine surgery described herein. A loop is present at the caudad end, as well as holes at the bottom and sides of the support structure allow for attachment of the model into the simulated abdominal cavity of a mannequin (not shown).

Also present is a rim (e.g., made of tubing) near the caudad end to simulate a pelvic brim, positioned at or near where a surgeon would anticipate the pelvic brim being located in the human anatomy. Further, a "U" shaped wall is present at or near the caudad end, and this wall has holes at or near the top of each side of the wall, to allow for later insertion of a tissue block including part of the rectum, sandwiched in muscle, into the "U" shape, such that, after the tissue block is inserted into the "U", the ends of the "U" are brought together (e.g., tied) at the top to create a circle (a "canal"), which compresses that tissue.

III. The Cassettes, and Mannequins Including the Cassettes

The cassettes described herein include biological tissue mimicking a colorectal, pelvic, bladder, and uterine system, and a support structure to which the tissue is adhered. The support structure, such as the embodiment shown in FIG. 1, is typically prepared from a thermoplastic material, like Kydex, and is adapted to a) be connected to a mannequin, and b) to affix the tissue into a simulated anatomic framework that mirrors the human abdomen and/or colorectal system, pelvis, bladder, and uterus.

The support structure is adapted to be connected to a mannequin, and to affix the tissue of the cassette into a simulated anatomic framework that mirrors the human abdomen and/or colorectal/pelvic systems. The support structure is also adapted to enable rapid changes of the cassette, which can facilitate surgical training of multiple surgeons. The support structures can be removed and replaced in a relatively rapid manner, so that multiple duplicative procedures can be done. In this manner, a single surgeon can practice a simulated colorectal, pelvic, bladder, and/or uterine operation multiple time, and/or multiple surgeons can practice a simulated operation.

In some aspects, the simulated anatomic framework is a silicone model of the abdominal cavity, and/or the cassette can be adapted for insertion into the simulated abdominal cavity of a mannequin. In some embodiments, the mannequin includes only the abdominal cavity, but in other embodiments, can also include one or more of a head, feet, and hands.

The simulated anatomic framework can be a silicone model of the abdominal cavity, and the cassette can be adapted for insertion into the simulated abdominal cavity of a mannequin.

In some embodiments, the tissue blocks are mounted in a human mannequin, and perfused with real and/or artificial/simulated blood. In other aspects, the tissue blocks are not perfused with real or simulated blood, but rather, a pulse is simulated mechanically, for example, by positioning a balloon in an appropriate position in the tissue blocks, and inflating and deflating the balloon. To mimic a "normal" pulse, the balloon is inflated and deflated at a rate of between about 60 and about 80 times per minute. Accordingly, in some aspects, the cassette is substantially devoid of real or artificial blood, and in others, the biological tissue is adapted to be able to perfuse real or artificial blood.

In one embodiment, a suspended support is present on the tissue, such as the esophagus, and the suspended support is secured to the mannequin with an elastic bungee cord to allow for diaphragmatic motion. In one aspect of this embodiment, the biological tissue comprises lungs, and the cassette further comprises a means for simulating respiration. The means for simulating respiration can include pneumatic balloon insufflation.

III. The Colorectal Model

Figure 2:
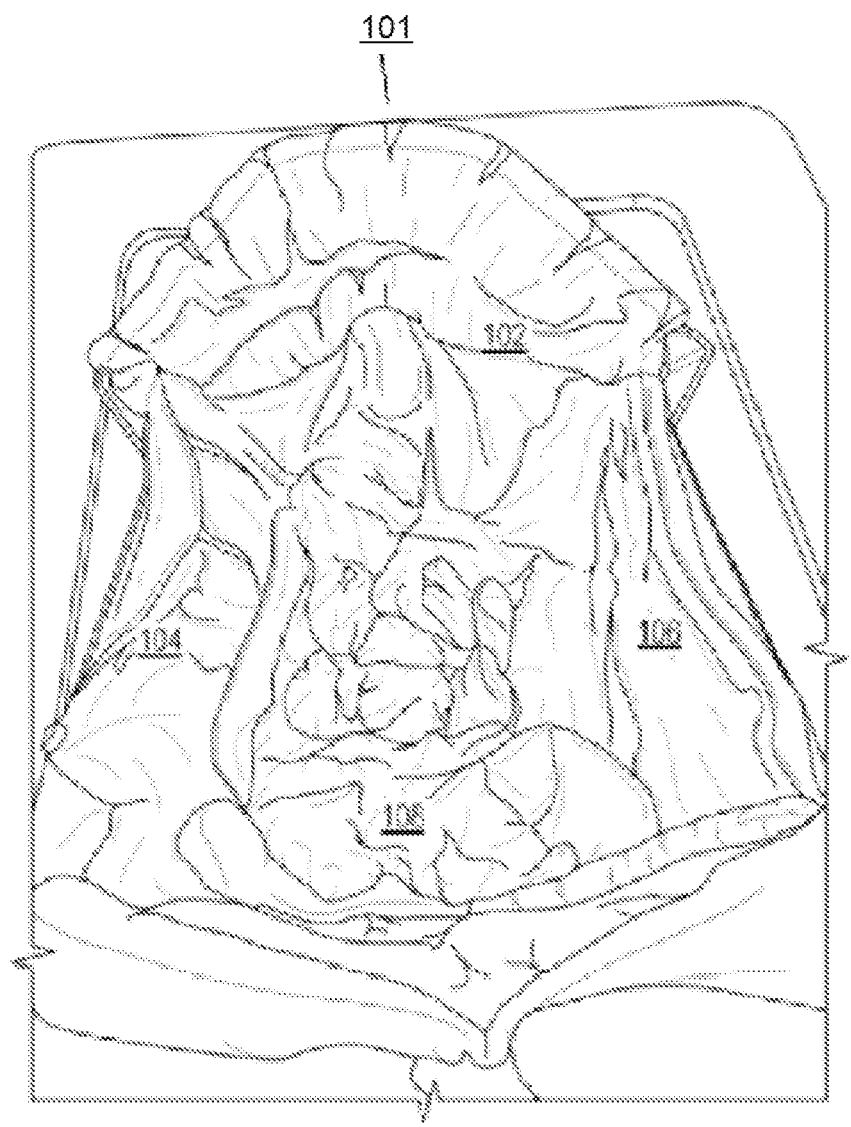
FIG. 2 is a schematic illustration of the support structure, after various tissue and organ components, including the uterus, left colon, the equivalent of a right colon formed from the left colon, and the equivalent of a transverse colon, formed from the left colon, are adhered either to the support structure, or to other tissue or organ components.
Figure 3:
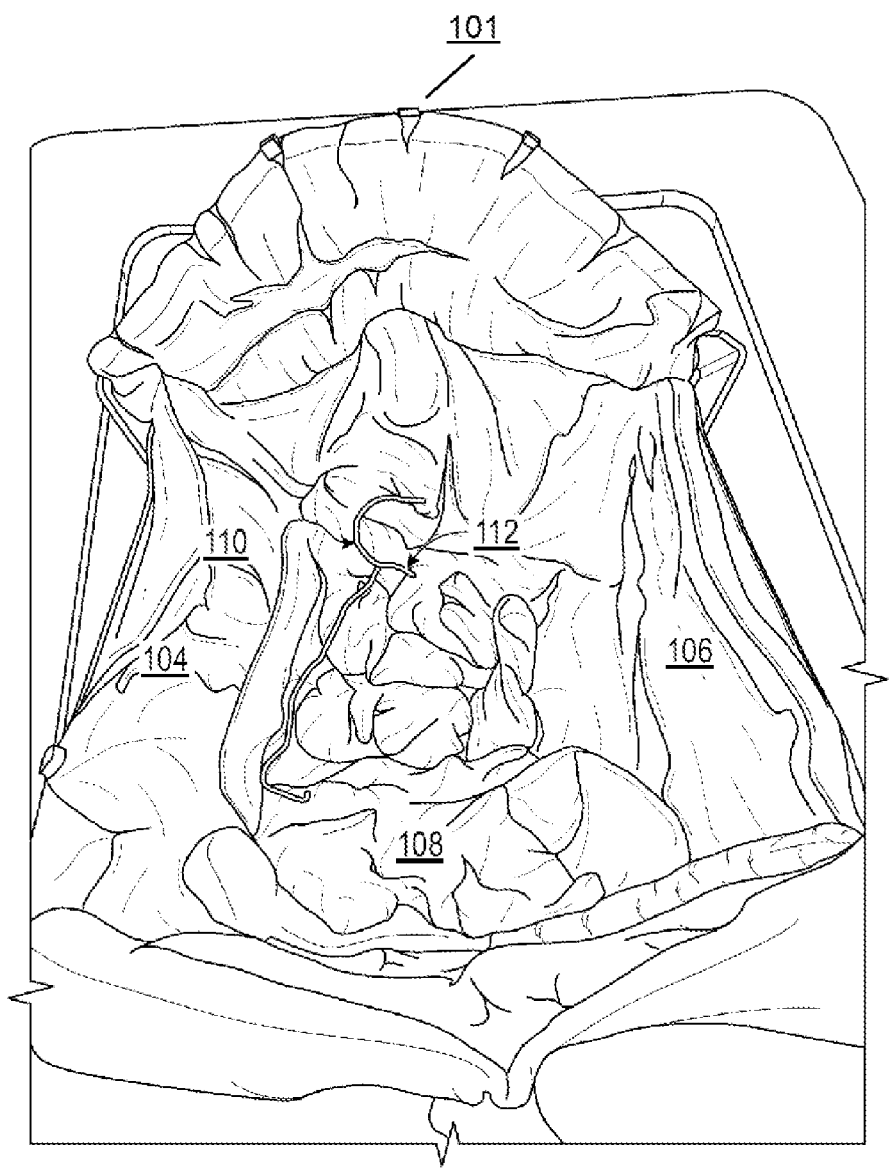
FIG. 3 is a schematic illustration showing how, after the left, right, and transverse colon are adhered to the support structure, or to other tissue adhered to the support structure, a simulated vascular component (Vascular Component 1) is inserted.
Figure 4:
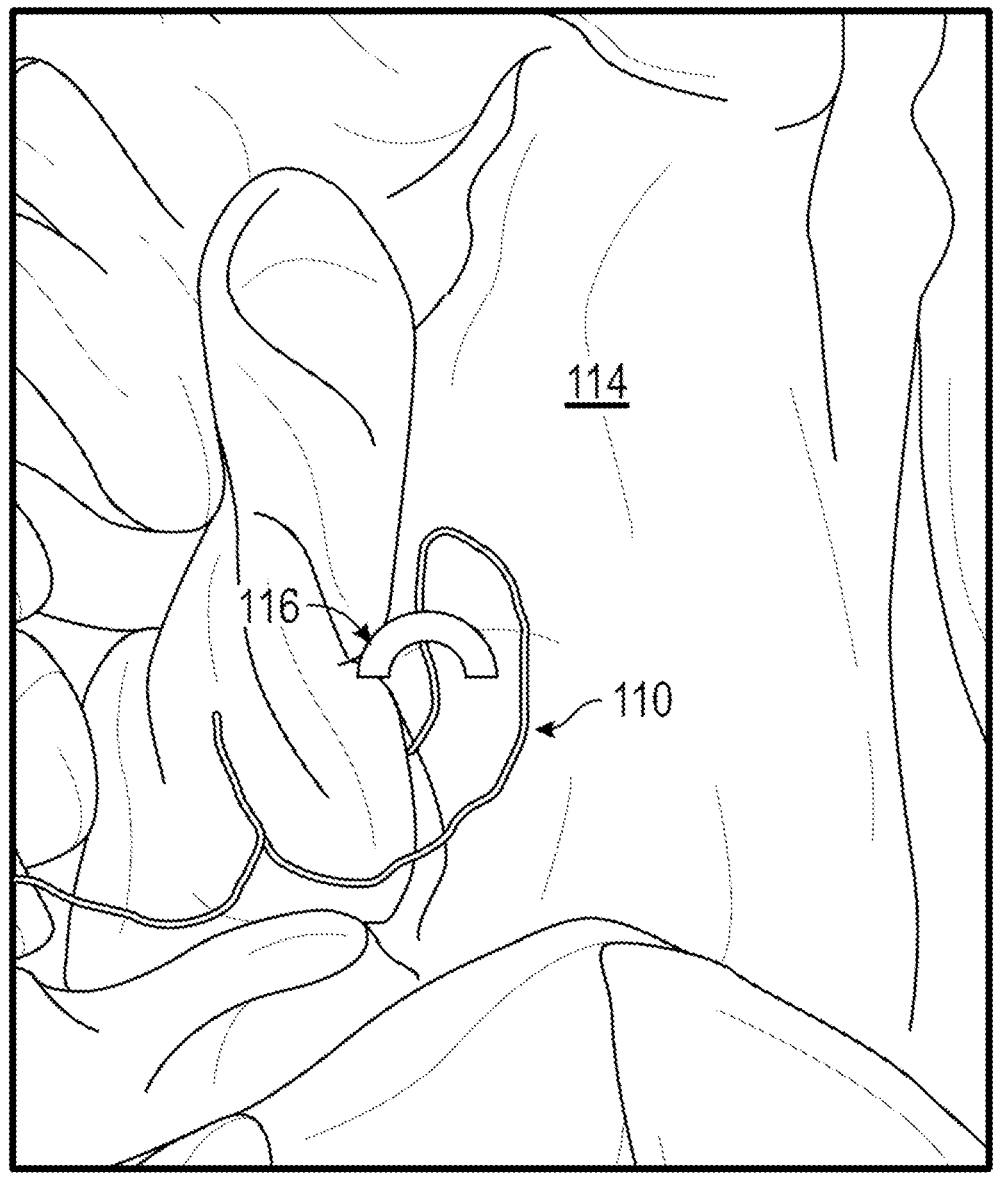
FIG. 4 is a schematic illustration showing how a duodenum is present, adjacent to the ileocolic artery, and a second simulated vascular component (Vascular Component 2) is present.

FIGS. 2-4 depict various tissue and organ components of a colorectal model adhered to a support structure according to some embodiments. FIG. 2 is a schematic illustration of the support structure, after various tissue and organ components, including the uterus (102), left colon (104), right colon (106), and transverse colon (108), are adhered either to the support structure, or to other tissue or organ components. A series of clips (101) are used to adhere tissue to the suspended support (50, not shown in this figure).

FIG. 3 is a schematic illustration showing how, after the left (104), right (106), and transverse colon (108) are adhered to the support structure, or to other tissue adhered to the support structure, a simulated vascular component (Vascular Component 1, 110) is inserted. A series of clips (101) are used to adhere tissue to the suspended support (50, not shown in this figure). Component 1 is initiated from the aorta by a tube, such as a ureter or artificial tube, simulating the inferior mesynteric artery.

FIG. 4 is a schematic illustration showing how a duodenum (116) is present, adjacent to the ileocolic artery (114), and a second simulated vascular component (Vascular Component 2, 124) is present.

FIGS. 2-4 show the addition of tissue/organs/organ systems to support structure shown in FIG. 1 to form a cassette as described herein. As shown in FIGS. 2-4, a portion of pig belly thinned out to between 0.5 and 2" in thickness, covers all or substantially all of the bottom and the side walls of the support structure, and is adhered to the support structure. In various embodiments, adhesion of the pig belly to the support structure may be performed, for example, using zip ties, sutures and/or adhesive, or other suitable fastening mechanisms.

Figure 5:
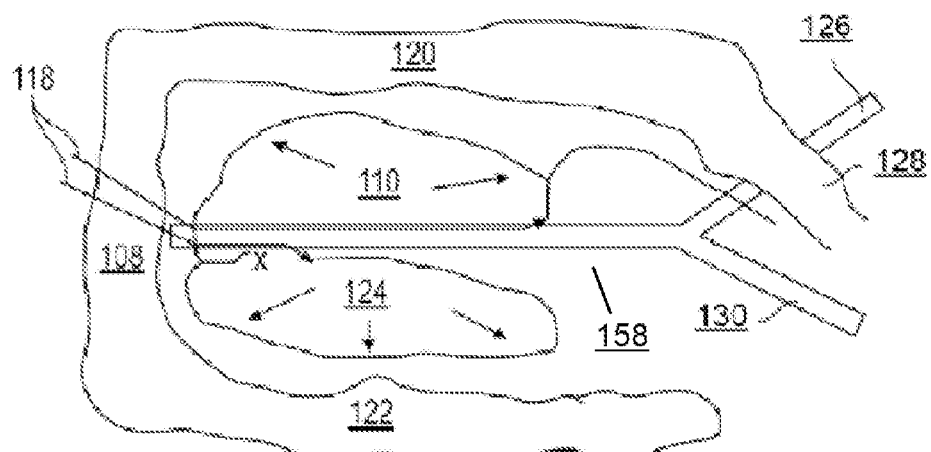
FIG. 5 is a diagram showing various components of an embodiment of the colorectal model described herein, including a left or descending colon, terminating in a sigmoid colon, a right or ascending colon, a transverse colon, Vascular Component 1, Vascular Component 2, an aorta, bifurcated into a right and left iliac artery, and perfusion lines within the aorta for carrying simulated blood.

FIG. 5 depicts a diagram showing various components of an embodiment of the colorectal model described herein, including a left or descending colon (120), terminating in a sigmoid colon (128), a right or ascending colon (122), a transverse colon (108), a Vascular Component 1 (110), a Vascular Component 2 (124), an aorta (158) that is bifurcated into a right (126) and left iliac artery (130), and perfusion lines (118) within the aorta for carrying simulated blood. With reference to FIG. 5, the aorta runs down an approximate centerline of the pig belly (relative to right and left sides of the pig belly), and is positioned approximately at a middle portion of the support structure (relative to right and left sides of the support structure).

The support structure comprises a rim (60) running perpendicular to the aorta across the width of the support structure, and beneath the suspended support, to simulate a pelvic brim, as shown in FIG. 1, and the aorta is bifurcated approximately 2 cm cephalad to the simulated pelvic brim. The rim may be made of a piece of tubing. A pair of ureters (not shown) are placed on the pork belly, each within one to two inches of each side of the aorta, and extend all or substantially all of the entire length of the aorta and along its respective branches (i.e., each ureter follows the bifurcation).

Figure 7:
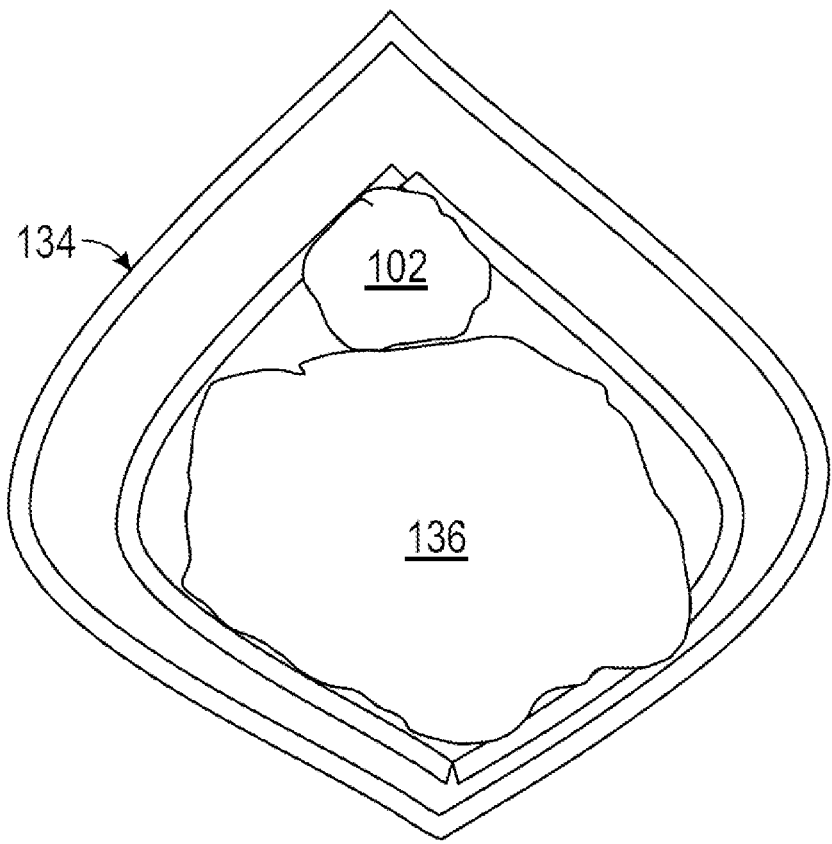
FIG. 7 is a diagram showing the cross-section of the rectal canal, where a wall of muscle surrounds the rectum, and, in this embodiment, a uterus.

FIG. 7 is a diagram showing the cross-section of the rectal canal, where a wall of muscle (134) surrounds the rectum (136), and, in some embodiments, a uterus (102). In some embodiments, the rectal canal includes a circumferential layering of muscle and rectum, optionally comprising at least 50% of the original mesentery from the animal from which it was obtained, and the layering of material is laid into the U-shaped canal of the support structure and adhered into place onto the pig belly at the caudal end of the support structure. In some embodiments, the layered muscle and rectal material may be adhered in place using sutures and/or adhesives, and the like.

Figure 8:
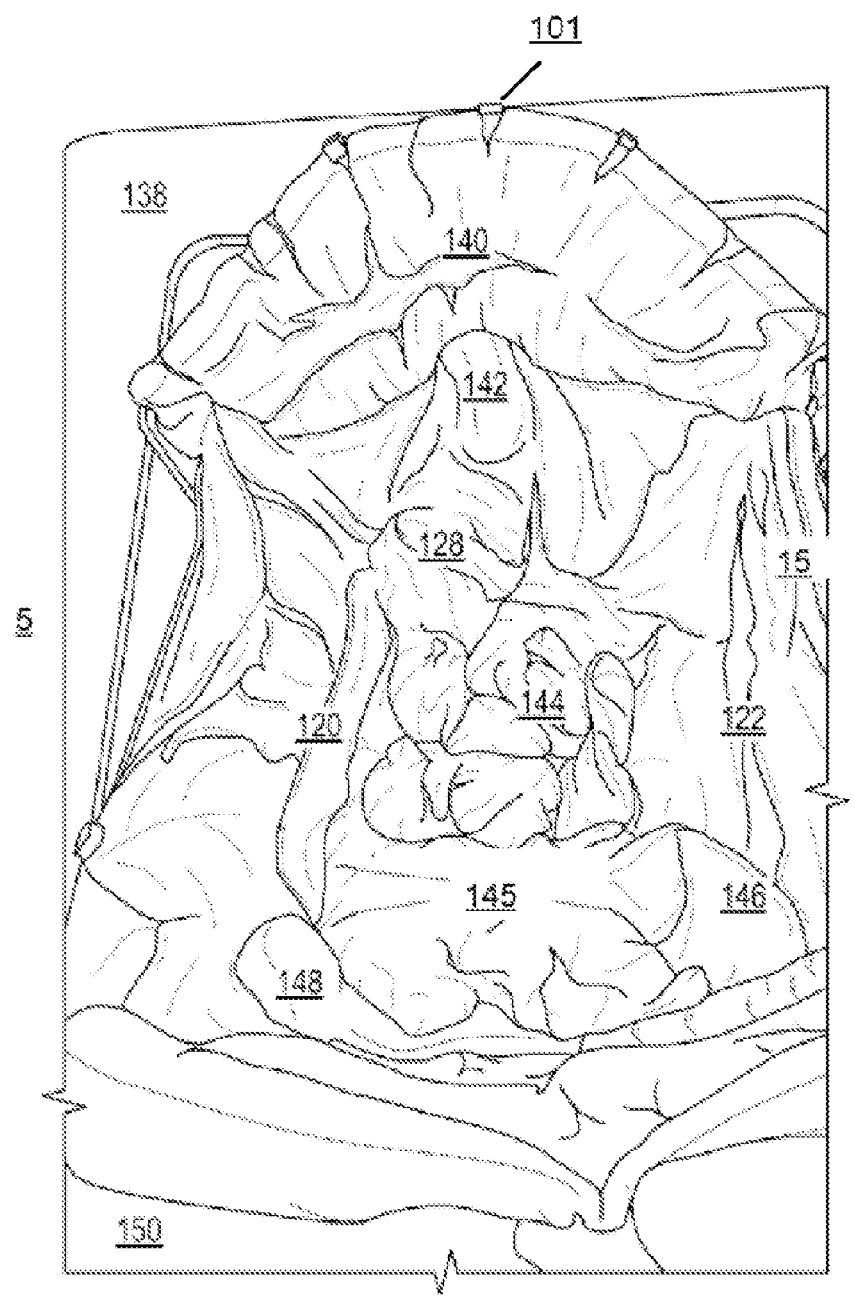
FIG. 8 is a schematic illustration showing one embodiment of the colorectal model described herein, showing both the caudad and cephalad ends of the support structure, with muscle suspended onto a suspended support.

FIG. 8 is a schematic illustration showing one embodiment of the colorectal model described herein, showing both the caudad (138) and cephalad (150) ends of the support structure, with muscle (140) suspended onto the support structure (50, not shown) using a series of clips (101).

With reference to FIGS. 2, 3 and 8, a left colon, right colon, and a simulated transverse colon are arranged in the model. A simulated human transverse colon can be prepared, for example, by coupling a porcine left colon and an inverted porcine left colon, to form a transverse colon, and the simulated colon can be adhered to the belly proximally relative to the sandwich of the muscle and rectum along the left lateral wall.

As depicted in FIGS. 3-5, a first vascular component (Vascular Component 1, (110)) is adhered, through the aorta (158) and into the mesentery, on the left colon (104), and a second vascular component (Vascular Component 2, 124)) is adhered, through the aorta (158) and into the mesentery, on the right colon (106).

As shown in FIG. 5, Vascular Component 1 (110) may be a hollow tube having a first end terminating in the mesentery of the rectum and an opposite second terminating in the mesentery of the transverse colon. Vascular Component 1 is designed to simulate the major blood vessels supplying the left colon (inferior mesenteric, superior rectal, left colic and left branch of the middle colic artery).

As further shown in FIG. 5, Vascular Component 2 (124) may be a hollow tube having one end that comes out of the aorta (158) at the top, and extending inferiorly to the ileocecal region simulating the ileocolic artery and then looping cephalad simulating the right branch of the middle colic artery then down the midline of the transverse colon mesentery terminating at the aorta. Vascular Component 2 is designed to simulate the mesentery vessels of the right and transverse colon, such as the ileocolic and the right branch of the middle colic. Vascular Component 1 and 2 may each connect to a "Y" adaptor (not shown in FIG. 5), which in turn may connect to a blood bag and/or pumps. Each of Vascular Component 1 and 2 may be made of biological tubing, and may be from ureters, blood vessels, and the like.

Component 1 comprises three tubes, namely, a left branch, a right branch, and a stem. The model can include a first perfusion tube (coming up through the aorta) connected to one of the three tubes in Component 1, such as the stem, such that the perfusion tube is in the aorta, and can be a length of plastic IV tubing that connects just prior to exiting the aorta to a limb of Component 1.

Component 2 comprises two tubes, or one long continuous tube that loops around and connects to one of the branches of Component 1, The model can include a second perfusion tube (coming up through the aorta) connected to one of the two tubes in Component 2.

In another embodiment, Component 1 and Component 2 are configured to connect and form one or more continuous loops.

The perfusion tubes can be connected to quick-connect or other suitable adaptors so that the perfusion tubes can be connected to a pump and/or blood bag and/or IV, so as to allow real blood and/or simulated blood to flow through the tubes.

The mesentery can be adhered to the lateral pork belly and to the aorta.

A portion of tissue resembling a duodenum can be adhered to the pork belly toward the right of the aorta.

A portion of small bowel comprising two ends, and comprising mesentery, can be secured to the pork belly, connected at one of the ends to the ascending colon (large bowel, or, in the human, the caecum), to simulate a terminal ileum, and at the other end, connects to the pork belly to the left of the aorta.

A descending colon can come up through the pelvis, past the spleen, and another piece of bowel can be adhered to the right lateral wall to simulate the ascending bowel.

The model can further comprise a portion of pig abdominal wall muscle adhered to the caudal end of the pork belly, and passed over and held in place on the suspended support, for example, using clips, zip ties, and the like.

The model can further comprise one or more intraluminal balloons placed inside the aorta and the iliac artery, to allow for simulation of pulsation of the aorta/iliac artery as the one or more balloons are inflated and deflated. The model can also include a means for inflating and deflating the one or more balloons, such as a pulsatile pump.

The model can further comprise an IV bag filled with simulated blood, connected to one or both of the first and second perfusion tubes, with a pump, such as a pulsatile pump, used to move fluid through the perfusion tubes.

The model can further comprise all or a portion of a liver and/or a spleen attached to the pork belly in an anatomically correct position.

In one embodiment, the cassettes described herein can be packaged in a vacuum sealed bag, and the biological tissue preserved using an alcohol-based preservative. The suspended support can also lay flat. This allows the biological tissue in the cassette to be preserved, stored, and shipped without substantial tissue degradation, and allows the cassettes to be easily placed into a mannequin. The cassettes can be stored, in a vacuum bag, in an aqueous alcohol solution.

In one embodiment, the support structure used in this model is the support structure shown in FIG. 1.

Not all of these components are required for a simulated colorectal model. One component that is present in various embodiments is the simulated transverse colon, which is not found in porcine anatomy, and is crafted by piecing together portions of more than one porcine colon. Another component that is present in various embodiments is the right, or ascending, colon. Pigs do not have an ascending colon, but human beings do. To use pig tissue as a proxy for human tissue, a section of the left colon of the pig can be used to mimic the ascending, or right, colon that would be present in the human anatomy.

Figure 6A:
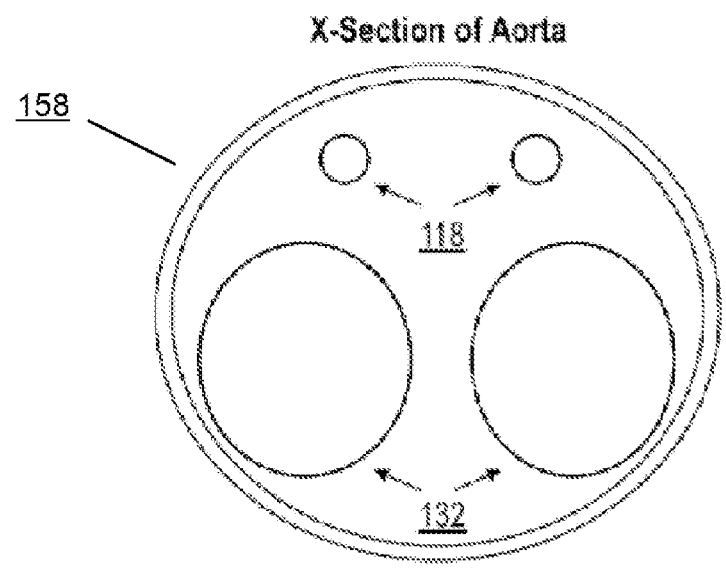
FIG. 6A is a diagram of a cross-section of an aorta, showing perfusion lines for carrying simulated blood, and balloons to allow, with expansion and contraction of the balloons, for movement of the aorta.

FIG. 6A is a diagram of a cross-section of an aorta (158), showing perfusion lines (118) for carrying simulated blood, and balloons 132) to allow, with expansion and contraction of the balloons, for movement of the aorta.

Figure 6B:
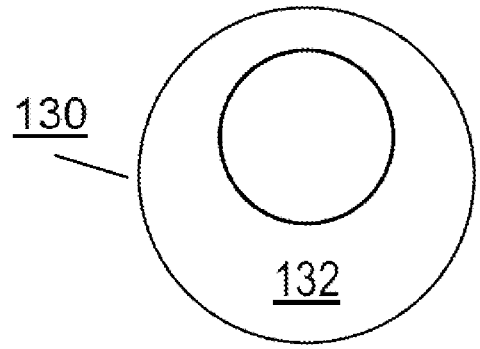
FIG. 6B is a diagram of a cross section of an iliac artery, showing a balloon disposed within the artery, to allow, when the balloon is inflated and deflated, for movement of simulated blood within the artery.

FIG. 6B is a diagram of a cross section of an iliac artery (130), showing a balloon (132) disposed within the artery, to allow, when the balloon is inflated and deflated, for movement of simulated blood within the artery.

FIG. 7 is a diagram showing the cross-section of the rectal canal, where a wall of muscle (134) surrounds the rectum (136), and, in this embodiment, and all or a portion of a uterus (102).

FIG. 8 is a schematic illustration showing one embodiment of the colorectal model described herein, showing both the caudad (138) and cephalad (150) ends of the support structure, as well as the left (5) and right (15) sides, with muscle 140) suspended onto the suspended support (50, not shown), using a series of clips (101). A reflected uterus (142) is shown below the suspended support, and below that, a sigmoid colon (128). Below the sigmoid colon, on the left side, is a left or descending colon (120), and on the right side, is a right or ascending colon (122). In the middle is a small bowel (144). Below this, on the left side, is a spleen (148), on the right is a liver (146), and in the middle, is a transverse colon with omentum (145).

These cassettes can be used in a surgeon training apparatus that includes the cassettes, and a mannequin, where the cassettes are inserted into the mannequin, and used, for example, in methods for simulating robotically-assisted or laparoscopic surgery.

The mannequin can include an animal tissue cassette, and be mounted on the operating table for the surgeon to then perform simulated surgery.

In any of the embodiments described herein, the surgical simulation system can include, along with the cassette and the mannequin in which the cassette is placed, a disposable plastic bag placed beneath the tissue block and support structure prior to placement in the mannequin to allow for easy cleanup and tissue disposal.

Further, in any of the embodiments described herein, the surgical simulation system can include along with the cassette and the mannequin in which the cassette is placed, a silicone drape placed inside the mannequin to simulate the retroperitoneal background and improve fidelity during use of the model.

Still further, in any of the embodiments described herein, the anterior abdominal wall can be constructed so as to allow for laparoscopic or robotic surgical training.

Cassettes including the tissue, organs, and/or organ blocks, along with the quick connections to sources of gas, vacuum, and/or animal or simulated blood, can be quickly inserted into a relevant portion of a segmented mannequin. The cassettes can be connected via one or more quick connect fittings to corresponding fittings on a convenient umbilical cable port to quickly prepare a mannequin for simulated robotic surgery.

In some embodiments, the operating table includes a lift mechanism to move the animal tissue cassette and/or mannequin between different operating positions.

Additional optional features of the model, and aspects of tissue/organ preparation, are discussed below.

IV. The Pelvic Model

Figure 9:
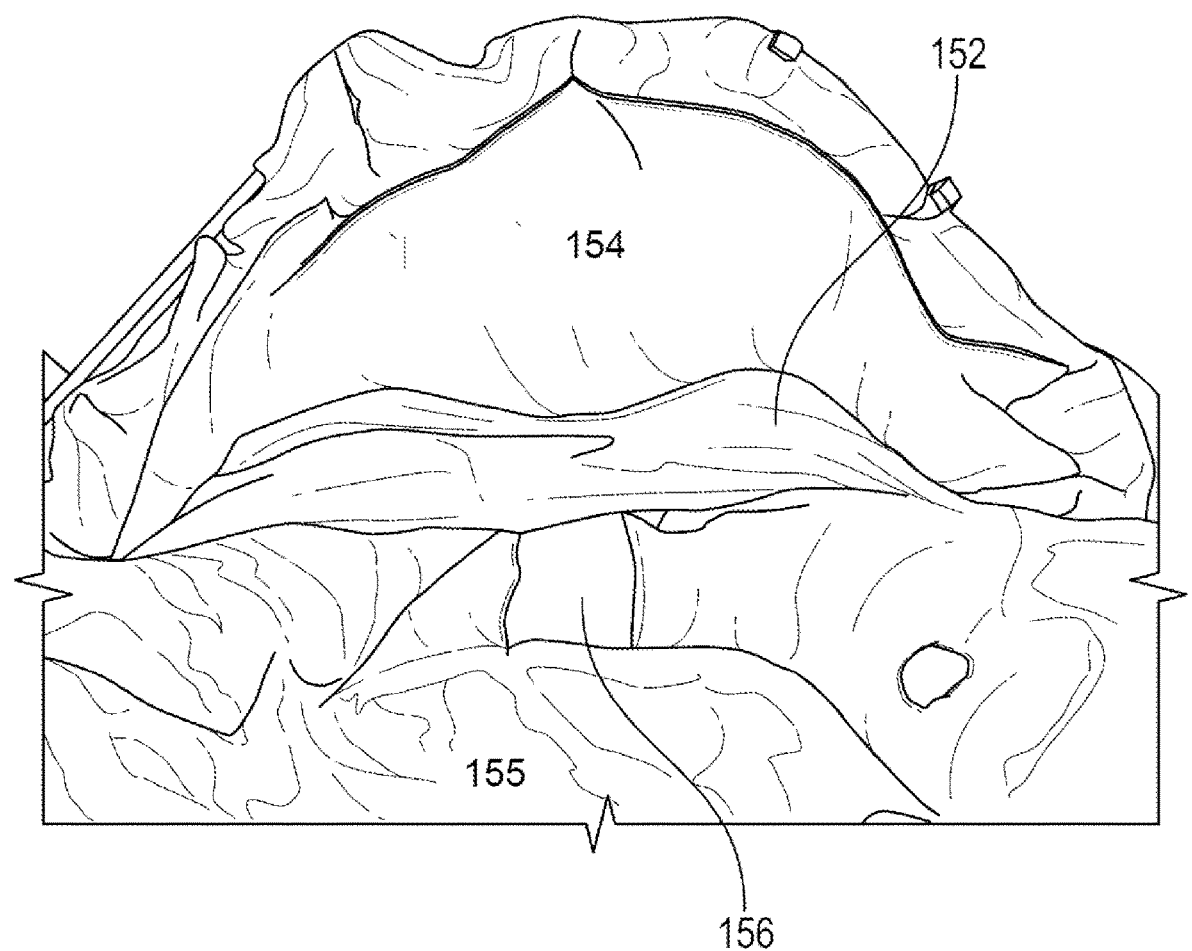
FIG. 9 is a schematic illustration of the support structure, after various tissue and organ components, including a muscle shelf, a rectal canal, and pericardium attached to muscle are adhered either to the support structure, or to other tissue or organ components.
Figure 10:
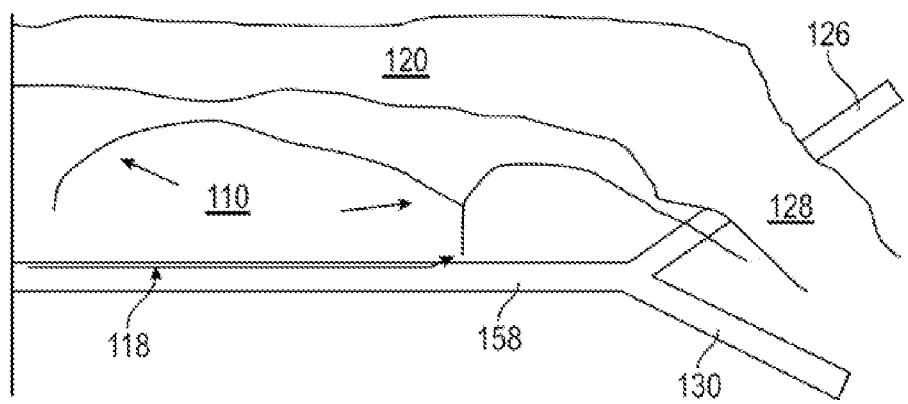
FIG. 10 is a schematic illustration showing how a simulated vascular component (Vascular Component 1) and a perfusion line are inserted into one embodiment of the model.
Figure 11:
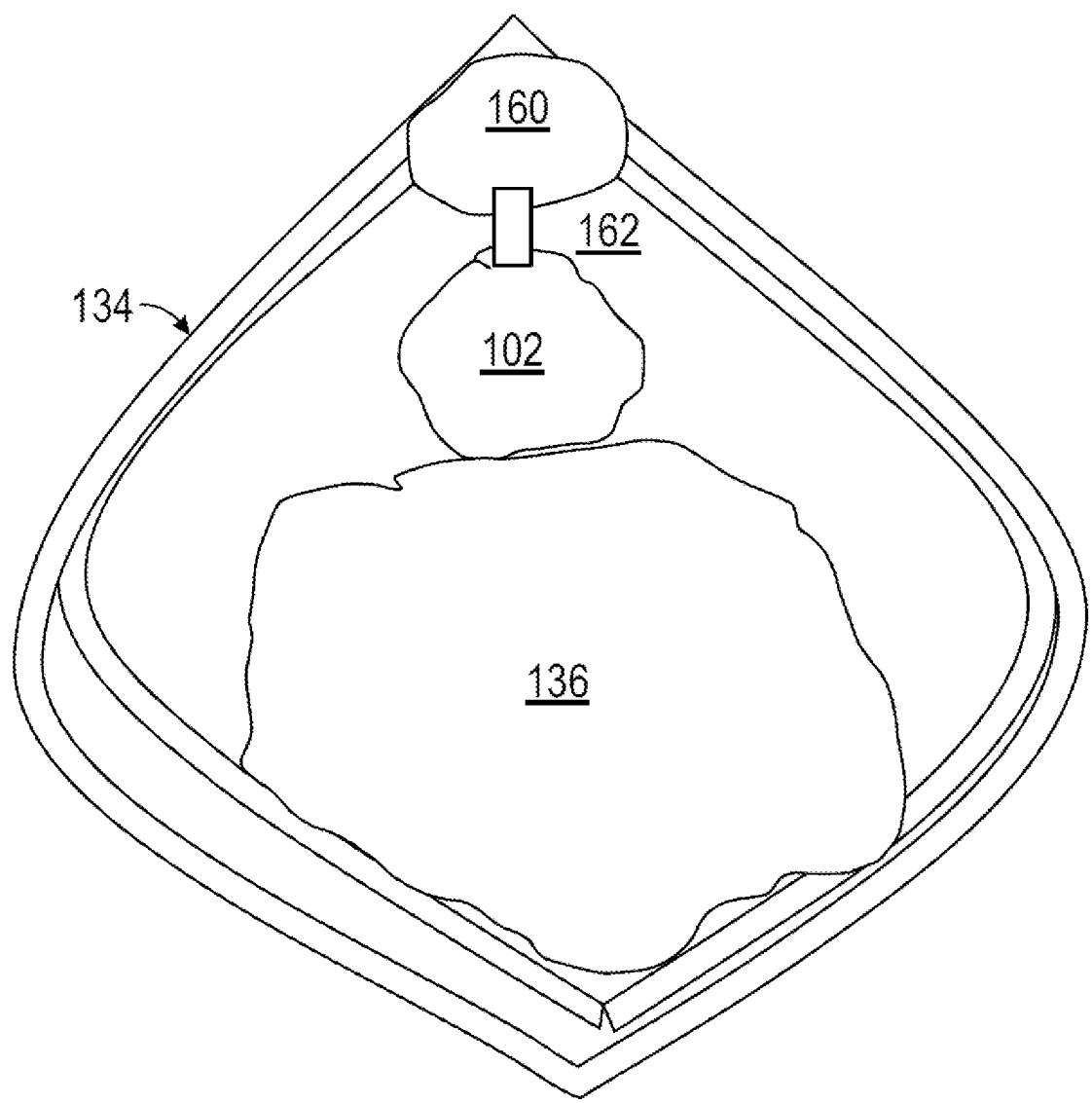
FIG. 11 is a schematic illustration showing a circumferential layering of muscle around a rectum, a urethra, a bladder, and a uterus, where the rectum and uterus are glued to the muscle.

FIGS. 9-11 depict various tissue and organ components of a pelvic model adhered to a support structure according to some embodiments. FIG. 9 is a schematic illustration of the support structure, after various tissue and organ components, including a shelf of muscle (152), muscle attached to the suspended support, where pericardium is attached to this muscle (the muscle and pericardium are collectively represented by 154), and a U-shaped rectal canal is shown (156).

FIG. 11 depicts how a circumferential layering of muscle tissue around a tissue block comprising all or part of a rectum, bladder, urethra and uterus is later inserted into the U-shaped canal, wherein open ends of the "U" are configured to be brought together (e.g., tied) at the top to compress the tissue in the tissue block.

As shown in FIG. 9, a portion of pig belly (155) thinned out to between 0.5 and 2" in thickness, covers all or substantially all of the bottom and the side walls of the support structure (50, not shown), and is adhered to the support structure. In various embodiments, adhesion of the pig belly to the support structure may be performed, for example, using zip ties, sutures and/or adhesive.

FIG. 10 is a schematic illustration showing how, after the left or descending colon (120) is adhered to the support structure (50, not shown), or to other tissue adhered to the support structure, a simulated vascular component (Vascular Component 1, 110)) is inserted through the aorta (158) and into the mesentery, on the left colon (not shown), and a perfusion line (118) is present in the aorta. Also shown is how the aorta (158) is bifurcated at or near the caudad end to form left and right (126) iliac arteries, where the right iliac artery is present under the sigmoid colon (128).

FIG. 11 is a diagram showing the cross-section of the rectal canal, where a wall of muscle (134) surrounds a rectum (136), a uterus (102), a bladder (160), and a urethra (162).

Figure 12A:
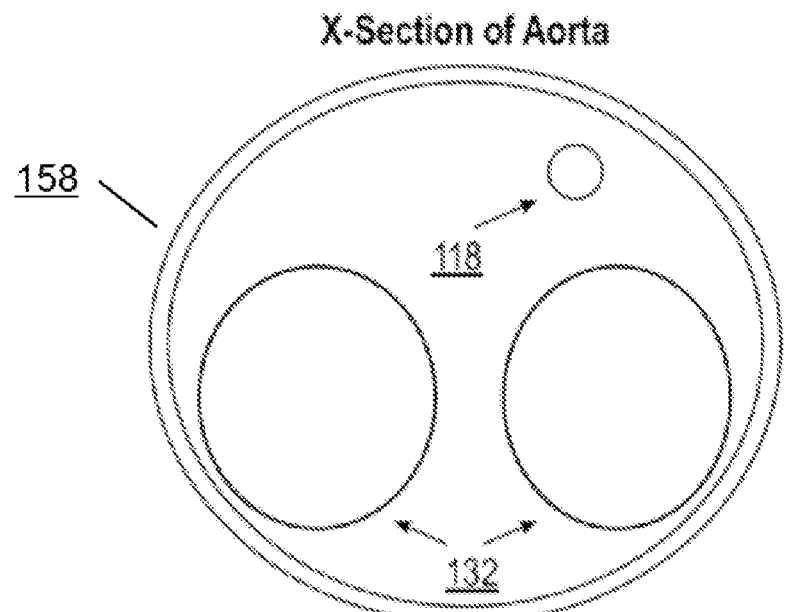
FIG. 12A is a diagram of a cross-section of an aorta, showing a perfusion line for carrying simulated blood, and balloons to allow, with expansion and contraction of the balloons, for movement of the aorta.
Figure 12B:
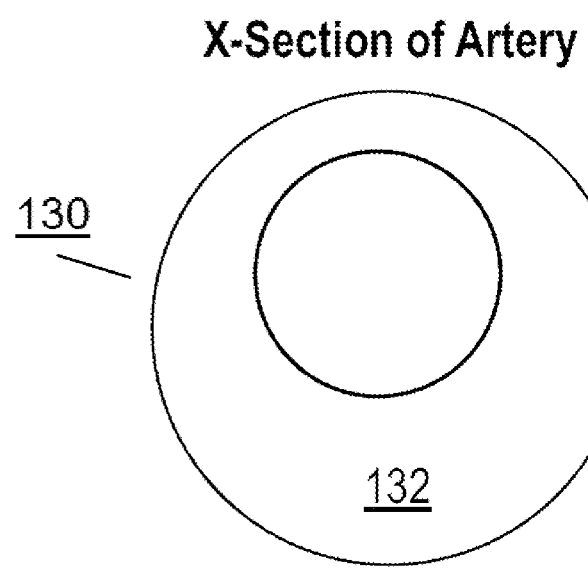
FIG. 12B is a diagram of a cross section of an iliac artery, showing a balloon disposed within the artery, to allow, when the balloon is inflated and deflated, for movement of simulated blood within the artery.

FIG. 12A is a diagram of a cross-section of an aorta (158), showing a perfusion line (118) for carrying simulated blood, and balloons (132) to allow, with expansion and contraction of the balloons, for movement of the aorta. The perfusion line (118) carries "blood" to the aorta, and the balloons (132) can be inflated and deflated to simulate a pulse. FIG. 12B is a diagram showing a cross section of an iliac artery (i.e., either or both of the left and right iliac arteries, represented as 130)), where a balloon (132) is present inside the artery. This allows, when the balloon is inflated and deflated, for movement of simulated blood within the artery.

In some embodiments, the perfusion lines carry "blood" to Component) and Component 2 through the aorta. The actual pulsation of the "blood" in the Components can be created by an external pump. The pneumatic pulsation of the balloons in the aorta/iliac impart pulsation to these vessels, but no free "blood" flows through them.

Figure 13A:
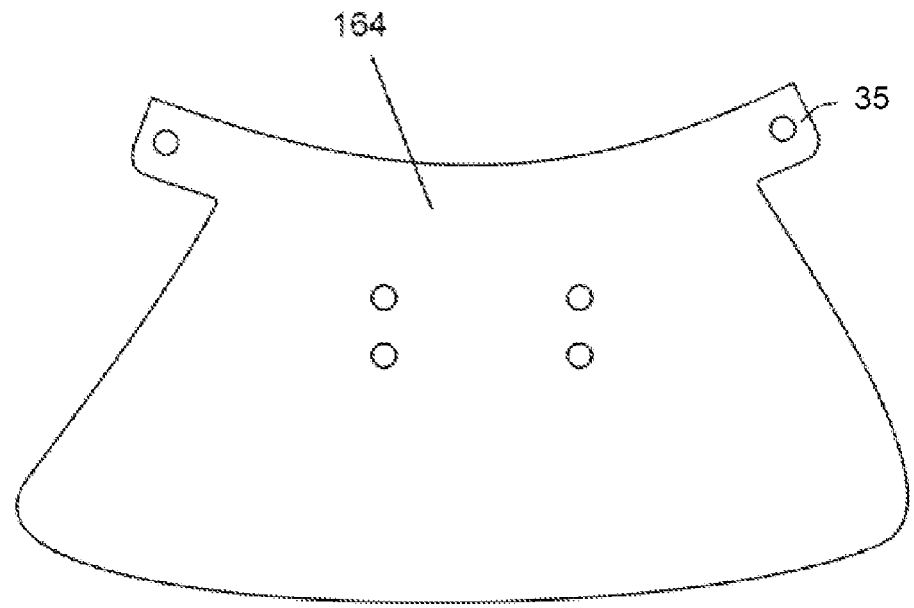
FIG. 13A is a diagram showing a cassette that can be attached to the support structure, for use in simulated gallbladder surgery.

FIG. 13A is a diagram showing a second cassette (164) adapted to be attachable to the first cassette in the pelvic model, at or near the cephalad end, using one or more of a series of holes (35). A gallbladder and other organs can be attached to the second cassette. This allows for the same first cassette to be used to simulate a number of simulated laparoscopic and/or robotically-assisted gallbladder operations, where all that is required between simulated operations is to detach the second cassette, and replace it with a new second cassette.

Figure 13B:
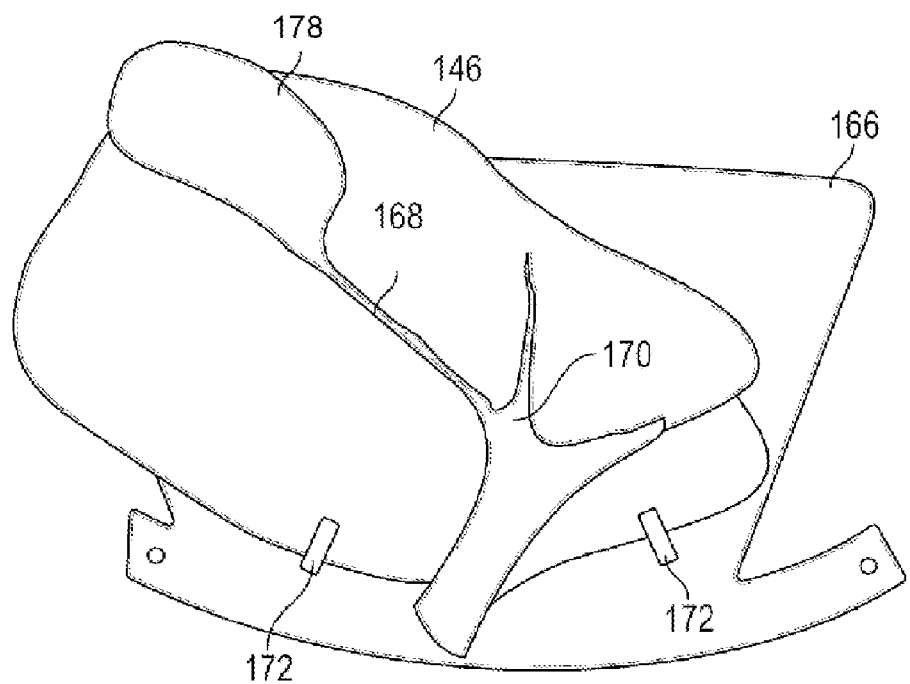
FIG. 13B is a diagram showing the cassette of FIG. 7A, with a gall bladder, liver, cystic duct, and common duct attached to the cassette with zip ties.

FIG. 13B is a diagram showing the second cassette of FIG. 13A, with a gallbladder (178), liver (146), cystic duct 168) and common duct (170) adhered to the cassette, in this embodiment, using zip ties (172), although adhesives, or other types of mechanical fasteners, can alternatively be used.

Figure 14:
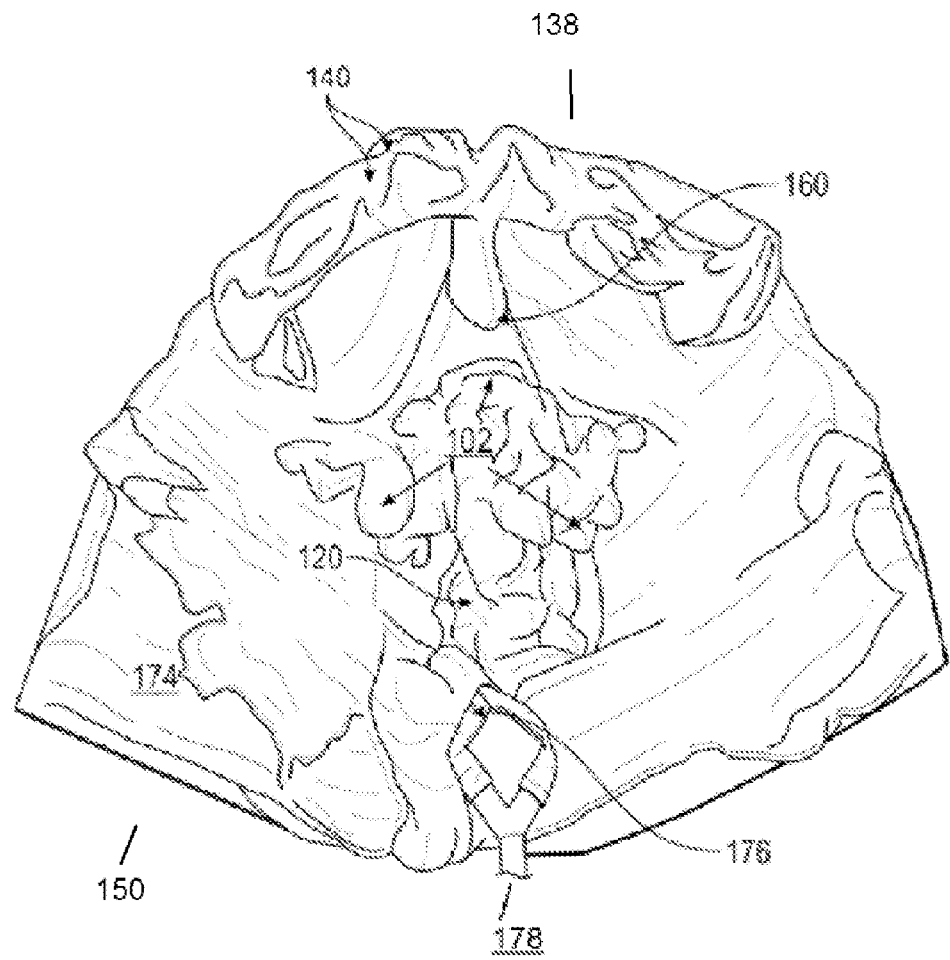
FIG. 14 is a schematic illustration showing one embodiment of the pelvic model described herein, showing both the caudad and cephalad ends of the support structure, with muscle suspended onto a suspended support, a shelf of muscle, an implanted aorta near the cephalad end, a descending colon, a uterus, a bladder, and a pork belly base.

FIG. 14 is a schematic illustration showing various components of an embodiment of the pelvic model described herein, including a left or descending colon (120), terminating in a sigmoid colon (128, not shown), an aorta (176) that is bifurcated into a right and left iliac artery, and a Vascular Component 1 implanted in the aorta (not visible, as it is implanted in the aorta). The Vascular Component 1 is attached, where the aorta splits off and each split terminates, to a "Y" connector (178).

Both the caudad (138) and cephalad (150) ends of the support structure are shown, with muscle (140) suspended onto the suspended support (not shown, as it is covered by the muscle) near the caudad end.

Not shown in this figure is a perfusion line that lies within the aorta, for carrying simulated blood. The aorta runs down an approximate centerline of the pig belly (relative to right and left sides of the pig belly), and is positioned approximately at a middle portion of the support structure (relative to right and left sides of the support structure). Also present in FIG. 14 is a bladder (160) and a uterus (102), and a base of pork belly (174) attached to the support structure (not shown). The bladder and uterus, as well as a rectum and urethra, are present in a circumferential layering of muscle around the rectum, the urethra, the bladder, and the uterus, which as shown in FIG. 14, is inserted into the U-shaped canal on the support structure shown in FIG. 1. The U-shaped canal is then closed off at the top (e.g., tied) to form a closed loop around this circumferential layering of muscle around the rectum, bladder, uterus and urethra. This is depicted in FIG. 14, after this circumferential layering has been inserted into the U-shaped canal, and shown in FIG. 11 before it is inserted into the canal.

The support structure comprises a piece of tubing running perpendicular to the aorta across the width of the support structure, and beneath the suspended support, to simulate a pelvic brim, as shown in FIG. 1, and the aorta is bifurcated approximately 2 cm cephalad to the simulated pelvic brim.

Also shown is a shelf of muscle (140), where muscle is attached to the suspended support on the support structure shown in FIG. 1, and where pericardium is attached to this muscle.

A pair of ureters are optionally placed on the pork belly, each within one to two inches of each side of the aorta, and extend all or substantially all of the entire length of the aorta and along its respective branches (i.e., each ureter follows the bifurcation).

In some embodiments, the rectal canal includes a circumferential layering of muscle around the rectum, the urethra, the bladder, and the uterus, optionally comprising at least 50% of the original mesentery from the animal from which it was obtained, and the layering of material is laid into the U-shaped canal of the support structure and adhered into place onto the pig belly at the caudal end of the support structure. In some embodiments, the layered muscle and rectal material may be adhered in place using sutures and/or adhesives, and the like.

As shown in FIG. 10, Vascular Component 1 may be a hollow tube having a first end terminating in the mesentery of the rectum and an opposite second terminating in the mesentery of the transverse colon. Vascular Component 1 is designed to simulate the major blood vessels supplying the left colon (inferior mesenteric, superior rectal, left colic and left branch of the middle colic artery.

Vascular Component 1 may connect to a "Y" adaptor. Vascular Component 1 may be made of biological tubing, and may be from ureters, blood vessels, and the like.

The model can include a perfusion tube (coming up through the aorta) connected to one of the three tubes in Component 1, such that the perfusion tube is in the aorta, and can be a length of plastic IV tubing that connects just prior to exiting the aorta to a limb of Component 1.

The perfusion tube can be connected to quick-connect or other suitable adaptors so that they can be connected to a pump and/or blood bag and/or IV, so as to allow real or simulated blood to flow through the tubes.

The mesentery can be adhered to the lateral pork belly and to the aorta.

A portion of small bowel comprising two ends, and comprising mesentery, can be secured to the pork belly, connected at one of the ends to the ascending colon (large bowel, or, in the human, the caecum), to simulate a terminal ileum, and at the other end, connects to the pork belly to the left of the aorta.

A descending colon can come up through the pelvis, past the spleen.

The model can further comprise a portion of pig abdominal wall muscle adhered to the caudal end of the pork belly, and passed over and held in place on the suspended support, for example, using clips, zip ties, and the like.

The model can further comprise one or more intraluminal balloons placed inside the aorta and the iliac artery, to allow for simulation of pulsation of the aorta/iliac artery as the one or more balloons are inflated and deflated. The model can also include a means for inflating and deflating the one or more balloons, such as a pulsatile pump.

The model can further comprise an IV bag filled with simulated blood, connected to the perfusion tube, with a pump, such as a pulsatile pump, used to move fluid through the perfusion tubes.

In one embodiment, the cassettes described herein can be packaged in a vacuum sealed bag, and the biological tissue preserved using an alcohol-based preservative. The suspended support can also lay flat. This allows the biological tissue in the cassette to be preserved, stored, and shipped without substantial tissue degradation, and allows the cassettes to be easily placed into a mannequin. The cassettes can be stored, in a vacuum bag, in an aqueous alcohol solution.

In one embodiment, the support structure used in this model is the support structure shown in FIG. 1.

While FIG. 14 shows various components of an embodiment of the model described herein, including a left or descending colon, terminating in a sigmoid colon, a bladder, a uterus, a urethra, a Vascular Component 1, and an aorta, bifurcated into a right and left iliac artery, and a perfusion line within the aorta for carrying simulated blood, not all of these components are required for a simulated pelvic model.

These cassettes can be used in a surgeon training apparatus that includes the cassettes, and a mannequin, where the cassettes are inserted into the mannequin, and used, for example, in methods for simulating robotically-assisted or laparoscopic surgery.

The mannequin can include an animal tissue cassette, and be mounted on the operating table for the surgeon to then perform simulated surgery.

In any of the embodiments described herein, the surgical simulation system can include, along with the cassette and the mannequin in which the cassette is placed, a disposable plastic bag placed beneath the tissue block and support structure prior to placement in the mannequin to allow for easy cleanup and tissue disposal.

Further, in any of the embodiments described herein, the surgical simulation system can include along with the cassette and the mannequin in which the cassette is placed, a silicone drape placed inside the mannequin to simulate the retroperitoneal background and improve fidelity during use of the model.

Still further, in any of the embodiments described herein, the anterior abdominal wall can be constructed so as to allow for laparoscopic or robotic surgical training.

In one embodiment, a second cassette (a "gallbladder model") that is capable of being attached to the support structure, or the first cassette, toward the cephalad end, is used to allow for simulated laparoscopic and/or robotically-assisted gallbladder surgery. Laparoscopic gallbladder removal is surgery to remove the gallbladder using a medical device called a laparoscope. Surgery using a laparoscope is the most common way to remove the gallbladder.

The gallbladder model includes two main parts, one being a molded second support structure, with holes present for attachment to the (first) support structure used in the pelvic model, and the other being appropriate tissue to simulate laparoscopic and/or robotically-assisted gallbladder surgery. The second support structure is shown in FIG. 13A, and a complete second cassette, including the second support structure and the tissue, is shown in FIG. 13B. The tissue includes a gallbladder, a liver, a cystic duct and a common duct. In one embodiment, the tissue is adhered to the second support structure using zip ties.

In certain embodiments, the second cassette includes kidney, blood vessels, and/or liver, in addition to or in place of the gallbladder.

The second cassette attaches to the first cassette or to the first support structure in a manner that places the tissue at or near where it would normally appear in human anatomy, which, in this case, is at or near the cephalad end of the first support structure.

In either the colorectal or pelvic models, cassettes including the tissue, organs, and/or organ blocks, optionally along with the quick connections to sources of gas, vacuum, and/or animal or simulated blood, can be quickly inserted into a relevant portion of a segmented mannequin. The cassettes can be connected via one or more quick connect fittings to corresponding fittings on a convenient umbilical cable port to quickly prepare a mannequin for simulated robotic surgery.

In some embodiments, the operating table includes a lift mechanism to move the animal tissue cassette and/or mannequin between different operating positions.

Additional optional features of the models, and aspects of tissue/organ preparation, are discussed below.

V. Optional Features of the Colorectal and Pelvic Models

Tissues/Organs/Organ Systems A group of animal tissue collections can be made from a series of animals before butchering for food so that no animals are sacrificed beyond what would be butchered for food. By collecting a series of tissue collections by the same facility using the same procedure from the same herd of animals (same breed, same age, same food), there will be extensive similarities among the collected tissue samples.

As is understood by those of skill in art, some features vary even between identical twins such as the vascular pattern around the exterior of the heart, so some features cannot be closely controlled. However, certain degrees of variability can be decreased by clustering tissue samples by gender of donor animal, nominal weight of donor animal, or some other property of the animal or classification made of the harvested tissue sample.

The organs used in the surgical simulators can be preselected so as to have various defects, such as tumors, valve defects, arterial blockages, and the like, or can be selected to be as close to identical as possible. In the former embodiment, a surgeon can demonstrate a particular type of operation where a particular defect is present, and in the latter embodiment, a surgical instructor can demonstrate a technique to multiple students, using organs that are closely matched, so that the results would be expected to be the same if the students perform the surgery correctly.

In general, the organs may be characterized using a wide variety of available metrics. These may include volume of ventricles, stiffness of the muscle tissue (restitution test), specific gravity, % fat, pressure testing, presence or absence of tumors, blockage or arteries, etc. The recorded metrics will be specific to the scenario being replicated. Ideally, the organs selected are as close to the size and weight of human organs.

Examples of classification of the tissue samples may include:

A) Some characterization of the amount of fatty material surrounding the tissue of interest.
B) Some characterization of the pliability/stiffness of the tissue.
C) Some characterization of the properties of the relevant blood vessels such as degree of occlusion.
D) One way to characterize an organ is the time it takes for a fluid to drip out from a container and into an organ. As the receiving volume of the organ will be relatively uniform (for organs of the same size) this may characterize the ability of fluids to flow through the structures in the organ and out.

Simulated Tumors

In some embodiments, tumors from animals can be harvested, an incision can be made in a tissue, organ or organ system in which a simulated tumor excision is to be performed, and the tumor adhered using surgical glue or caulk, such as silicone caulk. Alternatively, caulk, such as silicone caulk, can be appropriate shaped and hardened, and be used as a simulated tumor.

Where a tissue, organ, or organ system is to include a "hidden" tumor, which is intended to be found during a simulated surgical procedure, the incision can be made anywhere it is desired, and the tumor can be located (and, ideally, excised) by the physician during the simulated surgical procedure.

Like a tumor, a placenta is also highly vascularized. When inverted, placental tissue can reasonably mimic a tumor. In some embodiments, where it is desired to simulated surgical excision of tumors, a portion of placental tissue, turned inside out, can be adhered to a desired tissue, organ, or organ system, or wrapped around an artery, vein, or spinal cord, and the surgeon can practice surgical excision of such "tumors."

Use of Salt/Hydrogel Solutions to Provide Conductivity

In some aspects, a film of a salt/hydrogel solution overlies all or part of the biological tissue. This allows the biological tissue to conduct electricity, thus allowing a surgeon to practice electrocautery.

Representative Xenographic Organ Preparation

Sections of left colon, being the only straight portion of the porcine large bowel, are used to simulate the anatomic relationships of the human left colon.

In another embodiment, in addition to the organs discussed above, the biological tissue further comprises a length of porcine small intestine with intact mesentery, measuring between approximately 6 feet and approximately 8 feet in length, which allows a surgeon to practice simulated surgery on the small intestine. Examples of surgery on the small intestine, which can be performed laparoscopically, include the removal of adhesions (intestinal scar tissue), treatment of abdominal pain, removal of intestinal blockages or obstructions, removal of polyps/tumors, and treatment of internal hernias.

In one embodiment, a portion of small bowel is adhered to the support structure by drilling two or more holes in the support structure, and suturing the small bowel to the support structure and/or adhering the small bowel to the support structure with an adhesive, such as caulk or glue.

As an example of quick-connect tubes, small diameter plastic tubes with Luer-Lok® connectors can then be placed into the aorta and divided left and right iliac artery, and fixed in place, for example, using purse-string sutures.

Following preparation, the organs can be stored at a relatively low temperature, for example, 4 degrees Celsius, in an alcoholic solution, for example, 10% ethanol containing ½ teaspoon of red food coloring. In this manner, the organs typically remain fresh for at least 1 month. Use of higher concentrations of alcohol, such as 40% ethanol, can preserve the organs for over a year, and, ideally, up to 18 months, and can perform as well as freshly-harvested organs.

Simulating Bleeding

While there is value in having intact organs on which to operate, there is also value in having organs with a defect such that, during surgery, the simulation can test the surgeon's ability to handle bleeding organs or tissue.

One of the benefits of the present disclosure is the ability to precisely create trauma in ex vivo tissue samples, for example, by making one or more incisions, then "clotting" the blood composition to close the incision. During surgery, the clot can be dissolved, for example, by appropriately placing an agent in the blood that dissolves the clot, or by injecting an agent that dissolves the clot into an IV. The clotting agents and clot dissolving agents include those described above. The surgeon can then practice electrocautery.

Simulated Fat Layers

In one embodiment, the rectum can be anchored into the pelvis using an extra fat or muscle layer, for example, that is circumferentially adhered around the rectum to join it to the pelvis.

In prior art simulated organ systems, a thin layer, roughly an inch or less, of simulated fat was used by preparing a layer of silicone gel/caulk over a simulated organ. While this can be representative of thin patients, it is not representative of the type of overweight to obese patients normally seen in surgical procedures.

Pig bellies tend to include a large amount of fatty tissue. This fat can be harvested, and a layer of fat up to six inches thick, but preferably between about 1 and about 4 inches in thickness, can be adhered to an organ, for example, using surgical adhesive, caulk, and the like. The surgeon cutting into a "patient" in a simulated surgical procedure using a robotic instrument will have to cut through all of this fat to get to the tissue/organ/organ system, which can provide a realistic simulation.

Simulated Blood Formulations

In some embodiments, the simulated surgical model involves perfusing real and/or simulated blood through one or more of the organs, and in other embodiments, the organs are not perfused with real or simulated blood.

In some aspects of those embodiments where simulated blood is perfused, the simulated blood composition includes one or more colorants, including dyes and inks, which preferably color the composition red, but which can be any desired color. Examples of such colorants include, but are not limited to, food dyes such as red dye #40 and FD&C blue #1. Although red dyes can be used exclusively, blue or green dyes can be used to achieve a more realistic shade. As a general rule, arterial blood is bright red, while venous blood is a dark maroon color.

In some embodiments, the simulated blood compositions further include a protein, which can be a milk protein such as whey (including whey isolate and whey concentrate) or casein, egg white protein, an animal protein, such as beef protein, a vegetable protein, such as soy, pea, rice, or hemp, or combinations thereof.

Isolated proteins can be preferred, as they can impart the least "haze" to the blood, and result in a more natural appearance. However, if haze is not of concern, non-isolated proteins, such as milk products, including low-fat and non-fat milk, can be used. Any suitable protein can be used, so long as it can be "clotted" upon exposure to solutions of clotting agents, as such are defined herein. The concentration of the protein can vary, but is typically within the range of between about 0.1 and 10 by weight of the blood composition (dry weight).

Although not necessary, in some embodiments, the simulated blood compositions can include one or more sugars. Examples of sugars include glucose, dextrose, fructose, corn syrup, and the like. The concentration of the sugar can vary, but is typically within the range of between about 0.1 and 2 by weight of the blood composition (dry weight).

The simulated blood compositions can also include thickeners, such as xanthan gum and vegetable starches, such as potato starch, corn starch and hydro xyethyl starch (HES). At some concentration, these thickeners will cause the blood to thicken to the extent that it mimics a blood clot. However, if used at low enough concentrations, thickeners can be present in an amount sufficient that the blood has a viscosity within a range of plus or minus about 20 percent the viscosity of human blood.

The simulated blood compositions can optionally include one or more salts, including sodium and potassium chloride, and buffers such as those including phosphate, ascorbate, acetate, and similar salts, and their conjugate acids. For example, standard 0.9% phosphate buffered saline can be used.

The amount of salts, sugars, and proteins should be selected to provide a simulated blood composition with sufficient protein content to enable the blood to be clotted when clotting agents such as potato starch, corn starch, and hydroxyethyl starch are used, and with an osmolality and osmolarity within about 20% of that of human blood. Blood osmolality is typically measured in milliosmoles per kilogram, and a normal result is typically between about 275 and about 303 milliosmoles per kilogram. Accordingly, the simulated blood described herein preferably has an osmolality between about 220 and about 400 milliosmoles per kilogram.

In one embodiment, the ion concentration is selected to approximate that in 0.9% phosphate buffered saline, that is, to be within around 20% plus or minus of this ion concentration, so as to provide a simulated blood composition that can conduct electricity. This can be particularly important where a surgeon practicing a simulated surgical procedure intends to use electro-cautery to seal a wound. A simulated blood composition without a sufficient ion concentration would not conduct electricity in an efficient enough manner to simulate the actual electro-cautery conditions a surgeon would expect from a live patient, thus providing the surgeon with a less realistic training scenario.

Where electro-cautery is to be practiced, it is also important to provide a source of "ground." In one embodiment, this can be accomplished by attaching a wire directly to one of the tissues, organs, or organ systems described herein, for example, using an alligator clip. In one aspect of this embodiment, the clip can be attached to the esophagus, assuming the organ or organ system has an esophagus, or to another organ, if not. The "ground" is sufficiently far from the area in which the electro-cautery is to take place that it can avoid significant complications, although the organ may tend to burn at or near where the clip is located.

In another embodiment, where the tissues, organs, or organ systems described herein reside on a conductive support structure, such as a metal support structure, a piece of conductive tape can be adhered to the support structure. An alligator clip, adhesive pad, or other connective device attached to the wire can then be adhered to the conductive tape. Examples of conductive tapes include, but are not limited to, stainless steel tape, copper tape, silver tape, aluminum tape, and carbon fiber tape.

The pH of the compositions is preferably within one pH unit of the normal blood pH, which is around a pH of 7.4.

In some embodiments, it can be desirable to include a detergent, such as a cationic, anionic, non-ionic, or zwitterionic surfactant, in an amount suitable to allow the simulated blood to be more easily removed from clothing than if the detergent is not present.

Suitable nonionic surfactants include any of the conventional nonionic surfactant types typically used in liquid detergent products. These include alkoxylated fatty primary alcohol-based or secondary alcohol-based surfactants and amine oxide surfactants. In one aspect, for use in the liquid detergent products herein are those nonionic surfactants which are normally liquid.

The amount of detergent is typically less than around 1% by weight of the composition (dry weight), but the amount can be adjusted as desired.

In those embodiments where the simulated blood composition includes a detergent, it is also preferable to include a suitable defoamer. Otherwise, as the blood composition is pumped through organs in a simulated surgical procedure, the blood can foam undesirably. The defoamers are typically present in a concentration of between around 0.01 and 2 by weight of the composition (dry weight).

Preservatives and/or antioxidants can also be present, in an amount sufficient to extend the useful shelf life of the composition.

In some embodiments, the simulated blood formulations be within 20% of the osmolality of normal blood. Solutions/dispersions which have substantially the same osmolality of blood are isotonic. Solutions/dispersions which contain fewer particles and exert a lower osmotic pressure than 0.9% saline are called hypotonic, and those exerting higher osmotic pressures are referred to as hypertonic. The "clinical" significance of all this is to insure that isotonic or iso-osmolar solutions do not damage the animal or human tissue in the organs used in the simulated surgical systems. The pH of the compositions is preferably within one pH unit of the normal blood pH, which is around a pH of 7.4.

Clotting agents, if present, can be provided as a solution, dispersion, paste, spray, powder, and the like. Several clotting agents are commercially available, and can be included in a simulated blood "kit" in their commercial form. Similarly, clot dissolving agents can be provided as a solution, dispersion, paste, spray, powder, and the like. In use, they are can be added to the blood compositions, or introduced via injection into an IV bag.

Disposable Bag

A disposable plastic bag can be placed beneath the tissue block and support structure prior to placement in the mannequin to allow for easy cleanup and tissue disposal.

Silicon Drape

A silicone drape can be used inside the mannequin to simulate the retroperitoneal background and improve fidelity during use of the model.

Pulsatile Perfusion

Pulsatile perfusion can be accomplished by introducing luer tipped catheters into vessels which may include, for example, the abdominal aorta, the main celiac trunk or its major branches, gastroepiploic or mesenteric vessels. A simulated blood formulation, such as those described herein, can be infused using a pulsatile actuator. In this manner, fidelity can be enhanced, and vessel sealing exercises included in the surgical model. An alternative method of simulating pulsatile vascular flow can include placing a porcine ureter as a surrogate vessel into the model.

Dry Aortic Pulsation

Aortic pulsation can also be provided by placing a balloon with the native porcine aorta (descending aorta) using intermittent pneumatic or liquid inflation. Ideally, the balloon inflates and deflates between around 60 and 80 times per minute, so as to simulate a pulse. In this manner, a pulse can be mimicked without perfusing blood, which prevents leakage of fluid into the cavity.

VI. Producing the Pelvic Model

The pelvic model uses post mortem animal tissue configured so as to simulate portions of the alimentary track from the descending sigmoid colon to the anus. It allows surgeons to learn various skills necessary for performing laparoscopic and/or robotically-assisted bladder, uterine, colon and/or pelvic surgeries. Representative skills that can be practiced include one-handed/two-handed knot tying, running sutures, use of mechanical staplers, use of energy devices, use of surgical clips, instrument movement patterns, dissection of mesenteric vessels, perivascular lymph node dissections, and removal of periurethral fat.

The model can be used to simulate a number of laparoscopic and/or robotically-assisted surgical procedures. Representative surgical procedures that can be practiced using the pelvic model described herein include, but are not limited to:

Resection of the sigmoid colon
Lower anterior resections,
Laparoscopic cholecystectomy to treat gallbladder and bile duct diseases
Laparoscopic removal of a cancerous bladder
Ureteroneocystostomy
Uretero vesicle anastomosis
Bladder Diverticulectomy
Ureteral Reimplantation, including both refluxing and non-refluxing reimplantation
Enterocystoplasty
Vesicovaginal and Ureterovaginal Fistula
Urachal Surgery and Partial Cystectomy
Partial cystectomy
Radical cystectomy and extended lymphadenectomy
Urinary diversion Additional examples include myomectomy to remove fibroids from the uterus, surgery to remove peritoneal deposits, surgery to remove adhesions, hysteroscopy, hysterectomy, including radical hysterectomy, laser ablation, treatment of endometrial, ovarian, uterine, or other cancers in the pelvic region, treatment of endometriosis, removal of paratubal cysts, lymphadenectomy, treating various types of pelvic organ prolapse (POP), such as cystocele, involving the bladder, rectocele, involving the rectum, uterine prolapse, involving the uterus, vaginal prolapse, and enterocele, where the bowel or small intestine bulges into the vagina.

The real tissue composition of the model allows for very close simulation of human tissue in terms of dissection and mobilization, control of vascular supply, and anastomosing the bowel, and/or the urethral vesicle organs, using all commonly employed skills and technologies.

In one embodiment, tissue is harvested from euthanized animals (pigs) using a specific methodology that preserves intact the connective tissue, mesentery, vessels, bowel, and retroperitoneal structures.

The following is a description of the preparation of a representative model as described herein. Not every feature of the following description is essential to producing a successful model for simulating roboticically-assisted and/or laparoscopic colorectal, pelvic, bladder, and/or uterine surgery.

Pork belly can be mechanically thinned out to a thickness of between around 0.5 to 2" in thickness, more typically, approximately 1" thick. The pork belly can then be placed in the support structure to line the colorectal/pelvic synthetic platform. The pork belly is attached to the platform, for example, with zip ties or other mechanical devices, such as cord/twine and/or chemical adhesion, using an adhesive, such as cyanoacrylate. It may be sufficient to adhere the tissue to the support structure just around the edges, as the tissue is heavy enough to stay in one place during the simulated surgery, without having to adhere the entire surface of the tissue to the support structure.

The pig belly comprises a pig aorta, which is configured into a Y configuration to simulate a bifurcation, forming a left and right iliac artery near the base of the aorta. Inflatable balloons can be placed into the aorta/iliac artery.

In order to have the aorta appear mobile, one or more balloons can be inserted into the aorta and/or iliac, and the balloons blown up and deflated within the aorta and/or iliac, to give the appearance that the aorta/iliac is pulsing.

As discussed above, a perfusion line can optionally be used to supply the mesenteric vessels, which can be on the same or a separate pump, through the aorta, to the mesentery. In one embodiment, one can use an in-line pump within the aorta, so that as the balloons are inflated, it causes the fluid to flow.

The optional perfusion line, containing in-line balloons, can be placed into the aorto-iliac model with the perfusion line exiting the aorta approximately 1 to 4 cm, more typically, around 2 cm, proximal to the bifurcation and between around 4 and around 10 cm, more typically, around 6 cm, proximal to the bifurcation, for later connection to substitute mesenteric vessels. These vessels can be made of any bio-based material, such as ureters or blood vessels.

The aorto-iliac model is placed into the mounted pork belly in the midline with the bifurcation placed approximately 2 cm cephalad (i.e., toward the head) to the constructed pelvic brim. It exits the platform laterally on each side, and is secured into the constructed midline pork belly trench, for example, with sutures or other suitable mechanical fasteners, and/or an adhesive (such as superglue, caulk, and the like).

Ideally, specially harvested sigmoid/pelvic blocks from large pigs (i.e., around 100-250 pounds) are selected, as these tend to have the maximum amount of intact mesentery (i.e., greater than around half of the original mesentery, ideally at least around 60%, more preferably at least around 70%).

The lateral wings (horns) of the bifid uterus are typically retained, but in some embodiments, can be resected down to just above where the uterus meets the peritoneal reflection, preserving the broad ligaments. The abdominal aorta contained in the tissue blocks can be removed for use later in the preparation. A female pig has a single uterus, which bifurcates into two big horns. In a relatively large pig, the two horns often go to a single uterus. In some embodiments, these horns are removed, and the uterus to the rectum is maintained.

In some embodiments, one or more of the ureters or other bio-based vessels can be filled with small diameter plastic tubing and secured in the anatomically correct position on the mounted pork belly such that it runs just lateral to the aorta on each side, looping over the iliac vessels on each side, and terminating with the iliac arteries laterally.

In one embodiment, the skin island containing the anus is removed from the pelvic tissue block. This allows a surgeon a relatively easier access to the rectum to perform simulated surgeries. For example, in use, a surgeon may ultimately be placing a stapler or other tools through the rectum, so removing the anus and anal sphincter can make this easier.

The rectum, ureters, uterus, and bladder can be secured to a piece of pork belly muscle, posteriorly and laterally, using mechanical fasteners and/or adhesives. The muscle encases the these organs, creating the appropriate adhesions between the posterior and lateral aspects of the colon/uterus/bladder. A catheter can be placed through the urethra into the bladder a simulate bladder drainage during the human operation. The catheter can be removed during the performance of the urethral-vesicle anastomosis.

When the descending colon is anchored to the flanks of the abdominal wall, this can provide a realistic training experience for surgeons to dissect (peel/detach) the colon during simulated surgical procedures.

The frame, with muscle mounted on it, can optionally be pulled into apposition with the muscle surrounding the rectum and glued in place. The sigmoid bowel in the block can be extended along the left lateral wall of the platform to between around 1 and around 6", ideally around 3 to 4", from the top of the pork belly and, to facilitate later process steps, can be temporarily sutured or otherwise mechanically fastened to the lateral wall at that point.

Substitute mesenteric blood vessels can constructed, for example, from thinned out ureters. Alternatively, blood vessels can be used, but this may involve tying off side branches. Other types of biological vessels can alternatively be used.

Optional Component 1 is a Y configuration with a 2-4 cm, around 3 cm stem, and 15-25 cm, around 25 cm limbs. Component 1 includes three pieces of ureter or other tubing attached to a "Y" to simulate the mesenteric vessel, and this is used to supply simulated blood to the left colon.

The Y can be constructed using a small plastic Y connector. A small plastic connector can be placed in the stem to allow for connection to the perfusion tubing.

The sigmoid bowel mesentery can then be brought down to the aorta. Component 1 can be placed on the mesentery in position to simulate the inferior mesenteric artery, superior rectal artery inferiorly and the left colic vessel superiorly. It can then be glued and/or sutured or otherwise mechanically adhered in place. Alternately, the native mesentery is removed and replaced with a piece of perineal tissue in which the components of vessel substitute such as ureters are embedded. This substitute for mesentery is sutured and glued to the anti-mesenteric side of the bowel and extended down to the bowel.

Thin membrane (around the thickness of tissue paper), for example, from previously harvested broad ligament(s), can optionally be glued over the entire mesentery. The proximal stem can be connected to IV tubing coming out of the aorta, and pulled into the aorta.

The lateral walls can be lined with fatty tissue to represent retroperitoneal fat. This fatty tissue can come from any animal, though preferably comes from a pig.

The bowel and mesentery can be glued laterally to the fat and lateral pork belly wall. A thin membrane strip can optionally be sewn between the ascending and descending bowel and the lateral wall to simulate the lateral attachments. This suspends the ascending and descending bowel.

The pelvic canal can be closed (e.g., tied) to compress the canal. Compressing the canal allows for adhesion of the rectum, uterus, bladder, and urethra to the muscle, so that the surgeon can train in mobilization of the these organs. That is, the part of these organs, where it is sandwiched to the muscle, is inserted into that part of the support structure that forms a "U" shaped canal. After the tissue block is inserted into the "U", open ends of the "U" are closed together at the top (e.g., tied) to create a circle (a "canal"), which compresses that tissue. The end of the rectum and other organs can be sewn or otherwise adhered to the muscle to keep it from moving.

A piece of muscle, such as a piece derived from the pork belly, can be attached to the support structure, draped down onto the pork belly between the suspended support (proximal to the closed-off U-shaped canal) and the U-shaped canal (the bottom part of the Kydex model, where the U is now formed into the circle) and sutured or otherwise mechanically adhered in place. The membrane marking the peritoneal reflection can be secured laterally, for example, with adhesive and/or stitches.

A pericardium can optionally be attached to the muscle to simulate peritoneum.

In some embodiments, a paper towel soaked in an aqueous alcohol solution, which solution can include, for example, between around 10 and around 50% alcohol by volume, and the alcohol can be, for example, ethanol or isopropyl alcohol, such as around 20% ethyl alcohol, can be placed in the pelvis.

The balloons entering into the aorta and/or iliac arteries can be connected to connector, such as a ¼"×¼"×⅜" Y connector, and female connectors are placed on each of the 2 perfusion lines, so they can be hooked up to a pump.

The model can be vacuum packed with an aqueous alcoholic solution, such as 10-50% alcohol, for example, 20% alcohol, in the vacuum bags.

VII. Producing the Colorectal Model

The colorectal model uses post mortem animal tissue configured so as to simulate portions of the alimentary track from the ileum to the anus. It allows for learning the skills necessary for resection of the ascending colon, transverse colon, descending colon, sigmo-rectal colon, and anus and re-anastomosis of the remaining bowel to establish intestinal continuity. The real tissue composition of the model allows for very close simulation of human tissue in terms of dissection and mobilization, control of vascular supply, and reconnecting the bowel using all commonly employed skills and technologies.

In one embodiment, tissue is harvested from euthanized animals (pigs) using a specific methodology that preserves intact the connective tissue, mesentery, vessels, bowel, and retroperitoneal structures.

The following is a description of the preparation of a representative colorectal model as described herein. Not every feature of the following description is essential to producing a successful model for simulating roboticically-assisted and/or laparoscopic colorectal surgery.

Pork belly can be mechanically thinned out to a thickness of between around 0.5 to 2" in thickness, more typically, approximately 1" thick. The pork belly can then be placed in the support structure to line the colorectal/pelvic synthetic platform. The pork belly is attached to the platform, for example, with zip ties or other mechanical devices, such as cord/twine and/or chemical adhesion, using an adhesive, such as cyanoacrylate. It may be sufficient to adhere the tissue to the support structure just around the edges, as the tissue is heavy enough to stay in one place during the simulated surgery, without having to adhere the entire surface of the tissue to the support structure.

The pig belly comprises a pig aorta, which is configured into a Y configuration to simulate a bifurcation, forming a left and right iliac artery near the base of the aorta. Inflatable balloons can be placed into the aorta/iliac artery.

In order to have the aorta appear mobile, one or more balloons can be inserted into the aorta and/or iliac, and the balloons blown up and deflated within the aorta and/or iliac, to give the appearance that the aorta/iliac is pulsing.

As discussed above, two perfusion lines can be used to supply the mesenteric vessels, which can be on the same or a separate pump, through the aorta, to the mesentery. In one embodiment, one can use an in-line pump within the aorta, so that as the balloons are inflated, it causes the fluid to flow.

The two perfusion lines, each containing in-line balloons, can be placed into the aorto-iliac model with one perfusion line exiting the aorta approximately 1 to 4 cm, more typically, around 2 cm, proximal to the bifurcation and between around 4 and around 10 cm, more typically, around 6 cm, proximal to the bifurcation, for later connection to substitute mesenteric vessels. These vessels can be made of any bio-based material, such as ureters or blood vessels.

The aorto-iliac model is placed into the mounted pork belly in the midline with the bifurcation placed approximately 2 cm cephalad (i.e., toward the head) to the constructed pelvic brim. It exits the platform laterally on each side, and is secured into the constructed midline pork belly trench, for example, with sutures or other suitable mechanical fasteners, and/or an adhesive (such as superglue, caulk, and the like).

Ideally, specially harvested sigmoid/pelvic blocks from large pigs (i.e., around 150-250 pounds) are selected, as these tend to have the maximum amount of intact mesentery (i.e., greater than around half of the original mesentery, ideally at least around 60%, more preferably at least around 70%).

The bladder and most of the urethra can be removed. While this is not necessary, they might otherwise be in the way of simulated colorectal surgery, so ideally these are removed.

The lateral wings (horns) of the bifid uterus can be resected down to just above where the uterus meets the peritoneal reflection, preserving the broad ligaments. The ureters and abdominal aorta contained in the tissue blocks can be removed for use later in the preparation. A female pig has a single uterus, which bifurcates into two big horns. In a relatively large pig, the two horns often go to a single uterus. In some embodiments, these horns are removed, and the uterus to the rectum is maintained.

A section of the resected uterus can be saved for use as a simulated duodenum, but a synthetic tube, section of the bowel, or other equivalent for the duodenum, can be used in its place.

In some embodiments, one or more of the ureters or other bio-based vessels can be filled with small diameter plastic tubing and secured in the anatomically correct position on the mounted pork belly such that it runs just lateral to the aorta on each side, looping over the iliac vessels on each side, and terminating with the iliac arteries laterally.

In one embodiment, the skin island containing the anus is removed from the pelvic tissue block. This allows a surgeon a relatively easier access to the rectum to perform simulated surgeries. For example, in use, a surgeon may ultimately be placing a stapler or other tools through the rectum, so removing the anus and anal sphincter can make this easier.

The rectum can be secured to a piece of pork belly muscle, posteriorly and laterally, using mechanical fasteners and/or adhesives. The muscle encases the distal rectum, creating the appropriate adhesions between the posterior and lateral aspects of the colon.

In one embodiment, the bend between the ascending colon and the simulated transverse colon to the liver is anchored to the flanks of the simulated abdominal wall. In another embodiment, the bend between the transverse colon and the descending colon to the spleen is anchored to the flanks of the abdominal wall. When the ascending and descending colon are anchored to the flanks of the abdominal wall, this can provide a realistic training experience for surgeons to dissect (peel/detach) the colon during simulated surgical procedures.

The frame, with muscle mounted on it, is pulled into apposition with the muscle surrounding the rectum and glued in place. The sigmoid bowel in the block can be extended along the left lateral wall of the platform to between around 1 and around 6", ideally around 3 to 4", from the top of the pork belly and, to facilitate later process steps, can be temporarily sutured or otherwise mechanically fastened to the lateral wall at that point.

The bowel can then be extended transversely, and then caudad, along the right lateral wall to just above the simulated pelvic brim. If the length of bowel is of insufficient length to accomplish this, additional bowel can be obtained from other pelvic organ blocks, ideally preserving the mesentery, and connected to the sigmoid bowel, for example, using adhesive and/or sutures or other mechanical fasteners.

A relatively short length of harvested uterus can be sewed to the pork belly to the right of the aorta approximately 3 to 6 cm, ideally around 4.5 cm above the pelvic brim to simulate the retroperitoneal first and second portions of the duodenum.

Substitute mesenteric blood vessels can constructed, for example, from thinned out ureters. Alternatively, blood vessels can be used, but this may involve tying off side branches. Other types of biological vessels can alternatively be used.

Component 1 is a Y configuration with a 2-4 cm, around 3 cm stem, and 15-25 cm, around 25 cm limbs. Component 1 includes three pieces of ureter or other tubing attached to a "Y" to simulate the mesenteric vessel, and this is used to supply simulated blood to the left colon.

The Y can be constructed using a small plastic Y connector. A small plastic connector can be placed in the stem to allow for connection to the perfusion tubing.

Component 2 is a second Y configuration, similar to Component 1, with one limb connecting to the perfusion tube within the aorta and extending up the ascending colon before looping back to dead-end at the aorta. Proximal to this point, a Y connector can be used to connect to the left colic equivalent from Component 1.

Component 2 is essentially the same as Component 1, but can be used to provide simulated blood to the transverse and right colon.

The sigmoid bowel mesentery can then be brought down to the aorta. Component 1 can be placed on the mesentery in position to simulate the inferior mesenteric artery, superior rectal artery inferiorly and the left colic vessel superiorly. It can then be glued and/or sutured or otherwise mechanically adhered in place.

Thin membrane (around the thickness of tissue paper), for example, from previously harvested broad ligament(s), can be glued over the entire mesentery. The proximal stem can be connected to IV tubing coming out of the aorta, and pulled into the aorta.

Component 2 can be appropriately placed onto the mesentery of the descending aorta, glued in place, and covered with membrane glued to the mesentery. The stem of Component 2 can be tied off and sutured to the proximal aorta. The descending arm of the vessel can be connected to the second, more proximal, tubing, and pulled back into the aorta.

The lateral walls can be lined with fatty tissue to represent retroperitoneal fat. This fatty tissue can come from any animal, though preferably comes from a pig.

The bowel and mesentery can be glued laterally to the fat and lateral pork belly wall. A thin membrane strip can be sewn between the ascending and descending bowel and the lateral wall to simulate the lateral attachments. This suspends the ascending and descending bowel and suspends the transverse colon between the lateral walls. The mesentery of the ascending transverse, transverse colon, and descending colon can be attached to the aorta, for example, by gluing them together, and/or using sutures or other mechanical means.

The proximal pork belly can be folded up as a superior wall on the model and secured, for example, with a zip tie.

In those embodiments where the model includes a liver and/or spleen, a zip tie or other fastener can also be passed through the liver and also through the spleen, and this can be attached to the vertical part of the pork belly corresponding to these organs' natural position in the body. Alternatively, these organs can be adhered using stitches, adhesives, and the like.

A small piece of liver (for example, in the range of around 3-6" by 3-6") can be secured in the right upper quadrant of the support structure, and a small piece of spleen (2-4" by 2-4") can be secured in the left upper quadrant of the support structure.

A synthetic liver/spleen can be used, but if the natural product is available, this can be preferred. As the simulated surgery does not involve liver or spleen surgery, these are used as anatomic markers for identifying the hepato-colic and spleno-colic ligaments. The model can include all or part of the liver and all or part of the spleen, but the 3-6" and 2-4" pieces discussed above are representative of what can be used.

Fibrous tissue can then be placed between the liver and proximal transverse colon to duplicate the hepato-colic ligament and between the spleen and distal transverse colon to simulate the spleno-colic ligament.

The pelvic canal can be tied closed to compress the canal. Compressing the canal allows for adhesion of the rectum to the muscle so that the surgeon can train in mobilization of the rectum. That is, the part of the rectum, where it is sandwiched to the muscle, is inserted into that part of the support structure that forms a "U" shaped canal. After the tissue block is inserted into the "U", the ends of the "U" are tied together at the top to create a circle (a "canal"), which compresses that tissue. The end of the rectum can be sewn or otherwise adhered to the muscle to keep it from moving.

A piece of muscle, such as a piece derived from the pork belly, can be attached to the support structure, draped down onto the pork belly between the suspended support (proximal to the tied-off U-shaped canal) and the U-shaped canal (the bottom part of the Kydex model, where the U is now formed into the circle) and sutured or otherwise mechanically adhered in place. The membrane marking the peritoneal reflection can be secured laterally, for example, with adhesive and/or stitches.

In some embodiments, a paper towel soaked in an aqueous alcohol solution, which solution can include, for example, between around 10 and around 50% alcohol by volume, and the alcohol can be, for example, ethanol or isopropyl alcohol, such as around 20% ethyl alcohol, can be placed in the pelvis.

The balloons entering into the aorta and/or iliac arteries can be connected to connector, such as a ¼"×¼"×⅜" Y connector, and female connectors are placed on each of the 2 perfusion lines, so they can be hooked up to a pump.

The model can be vacuum packed with an aqueous alcoholic solution, such as 10-50% alcohol, for example, 20% alcohol, in the vacuum bags.

A segment of small bowel is placed in the mid-abdomen with one end attached to the colon in the cecal position and the other at the base of the transverse colon to the left of the aorta. The presence of the terminal small bowel allows one to perform a simulated right colectomy.

A sheet of connective tissue can then be draped over the transverse colon to simulate the omentum.

With either of the pelvic or colorectal models, one or more of the following miscellaneous preparative methods can also be used.

Small Bowel Preparation

A length of porcine small intestine with intact mesentery, for example, measuring approximately 6-8 feet in length, can be present. One way to prepare the intestine for use in the model involves vigorous open irrigation, using tap water, for example, until clear. This process removes internal material and creates distension of the bowel, which persists and better simulates the human condition. In one embodiment, water soluble lubricant is placed in the colon and small bowel to partially distend the bowel.

VIII. Use of Cassettes/Mannequins in Simulated Surgery

In use, the cassettes, which are adapted to fit inside a mannequin, are inserted into a mannequin, and the surgeon then practices surgery on the tissue within the cassette.

Where the tissue comprises porcine tissue blocks that include two or more, preferably three or more, more preferably four or more, and most preferably, all of the lungs, heart, aorta, esophagus, diaphragm, stomach, duodenum, liver, and spleen, but does not include the small intestine or bowel, the types of operations are typically operations performed on a patient's colorectal system, pelvis, bladder, and/or uterus.

When the tissue further comprises small intestine or bowel, this allows for additional types of surgeries, as discussed herein. Where the esophagus is present, the surgeon can enter the stomach through the esophagus to perform additional types of operations relative to when the esophagus is not present.

The cassettes, present in a mannequin, can be used, for example, in methods of simulating one or more of the following types of colonic, pelvic, uterine, and/or bladder operations, when carried out in a robotic or laparoscopic manner:

Pelvic Model
    Resection of the sigmoid colon
    Lower anterior resections,
    Laparoscopic cholecystectomy to treat gallbladder and bile duct diseases
    Laparoscopic removal of a cancerous bladder
    Ureteroneocystostomy
    Uretero vesicle anastamosis
    Bladder Diverticulectomy
    Ureteral Reimplantation, including both refluxing and non-refluxing reimplantation
    Enterocystoplasty
    Vesicovaginal and Ureterovaginal Fistula
    Urachal Surgery and Partial Cystectomy
    Partial cystectomy
    Radical cystectomy and extended lymphadenectomy
    Urinary diversion
    Additional examples include myomectomy to remove fibroids from the uterus, surgery to remove peritoneal deposits, surgery to remove adhesions, hysteroscopy, hysterectomy, including radical hysterectomy, laser ablation, treatment of endometrial, ovarian, uterine, or other cancers in the pelvic region, treatment of endometriosis, removal of paratubal cysts, lymphadenectomy, treating various types of pelvic organ prolapse (POP), such as cystocele, involving the bladder, rectocele, involving the rectum, uterine prolapse, involving the uterus, vaginal prolapse, and enterocele, where the bowel or small intestine bulges into the vagina.

Colorectal Model
    Treatment of colon cancer, inflammatory bowel disease, benign colon tumors, or colonic obstruction:
    Resection of the right colon with intraperioneal colo-colostomy reconstruction,
    Resection of the transverse colon with intraperioneal colo-colostomy reconstruction,
    Resection of the sigmoid colon with intraperioneal colo-colostomy reconstruction,
    Resection of the sigmo-rectum with intraperioneal colo-colostomy reconstruction (low anterior resection),
    Resection of the rectum and anus (Abdominal peritoneal resection, AP resection),
    Construction of ileostomy or colostomy,
    Control of mesenteric vessels with surgical clips, surgical staplers, or energy devices
    Mobilization of right and/or left colon and/or rectum, and
    Total mesorectal excision (TME).

VI. Robotically-Assisted Surgery

In the simulated surgical procedures described herein, one or more surgeons can perform surgery on the animal tissue, organs, and/or organ blocks using robotic surgical or telesurgical instruments. Typically, robotic surgical or telesurgical systems include one or more surgical manipulators or manipulator assemblies, which comprise one or more movable links and joints. The manipulator assemblies control one or more tools, such as an endoscope (which provides the surgeon with the ability to see inside of the patient, and, typically, a tool selected from the group consisting of jaws, scissors, graspers, needle holders, micro-dissectors, staple appliers, tackers, suction irrigation tools, clip appliers, cutting blades, cautery probes, irrigators, catheters, suction orifices, lasers, and lights.

In robotically-assisted telesurgery, an operator (e.g., the surgeon) uses a user input system to operate and control the motion of surgical instruments at the surgical site from a location that may be remote from the surgical simulator (e.g., across the operating room, in a different room, or a completely different building from the surgical simulator).

The user input system usually includes one or more hand input devices, such as handheld wrist gimbals, joysticks, exoskeletal gloves or the like. These control the movement of one or more of the robotic arms. Occasionally, line-of-sight/gaze tracking and oral commands are used to control movement of one or more of the robotic arms, and/or the audio/video components that transmit signal back to the surgeon.

For minimally invasive surgical procedures, the surgical instruments, controlled by the surgical manipulator, can be introduced into a simulated body cavity through a single surgical incision site, multiple closely spaced incision sites on the simulated body, and/or one or more natural orifices in the anatomy of the organ and/or organ block (such as through the rectum where a porcine or other animal gastrointestinal system is used as the organ block).

For some minimally invasive surgical procedures performed through particularly small entry ports, multiple surgical instruments may be introduced in a closely gathered cluster with nearly parallel instrument shafts.

A more detailed explanation of certain the components of telesurgical systems is provided below:

In a telesurgical system, an operator uses the user input system to operate a manipulator assembly in a leader-follower configuration. The user input system is the leader and the manipulator assembly is the follower. In a leader-follower configuration, the leader's motion teleoperates a follower's motion. (The leader-follower configuration was traditionally called a "master-slave" configuration.) One example of a leader-follower configuration is a teleoperated surgical system that operates with at least partial computer assistance (a "telesurgical system"). Telesurgical systems may be hand-held or mechanically grounded. Other examples of leader-follower configurations occur in teleoperated systems such as systems used in hazardous environments (e.g., working under water or in nuclear power plants, handling toxic chemicals or explosives, etc.).

A telesurgical system includes the user input system, also referred to as surgeon's console, for inputting desired actions for a surgical procedure and a patient-side manipulator (PSM), for robotically moving surgical instruments at a surgical site within a patient. The telesurgical system is used to perform minimally invasive robotic surgery. One example of a telesurgical surgical system architecture that can be used to implement the systems and techniques described in this disclosure is a da Vinci®. Surgical System manufactured by Intuitive Surgical, Inc. of Sunnyvale, Calif. Alternatively, a smaller scale robotic surgical system with a single manipulator arm may be suitable for some procedures. The robotic surgical system also includes an image capture system, which includes an image capture device, such as an endoscope, and related image processing hardware and software. The robotic surgical system also includes a control system that is operatively linked to sensors, motors, actuators, and other components of the user input system and the manipulators and to the image capture system.

The system is used by a system operator, generally a surgeon, who performs a minimally invasive simulated surgical procedure on a simulated patient. The system operator sees images, captured by the image capture system, presented for viewing at the user input system. In response to the surgeon's input commands, the control system effects servo-mechanical movement of surgical instruments coupled to the manipulators.

The control system includes at least one processor and typically a plurality of processors for effecting control between the user input system, the manipulators, and the image capture system. The control system also includes software programming instructions to implement some or all of the methods described herein. The control system can include a number of data processing circuits (e.g., on the user input system and/or on the manipulators), with at least a portion of the processing optionally being performed adjacent an input device, a portion being performed adjacent a manipulator, and the like. Any of a wide variety of centralized or distributed data processing architectures may be employed. Similarly, the programming code may be implemented as a number of separate programs or subroutines, or may be integrated into a number of other aspects of the robotic systems described herein. In one embodiment, control system may support wireless communication protocols such as Bluetooth, IrDA, HomeRF, IEEE 802.11, DECT, and Wireless Telemetry.

The telesurgical system can also include an instrument chassis that couples to the manipulators. The instrument chassis provides a common platform for coupling surgical instruments and endoscope for introduction into an entry point on the simulated patient. In one embodiment, the entry point can be a mouth, where access to the throat or larynx is desired, the rectum where access to the gastrointestinal system, or, more particularly, to the colon, is desired, or previously-prepared or surgically created openings or orifices.

In one embodiment, the system can also include an instrument chassis having a proximal section and a distal section. The chassis supports an instrument. Generally, the dimensions and shape of the chassis at its distal section are typically reduced compared to its proximal end, to minimize the volume of the surgical equipment near the surgical entry point. Instrument interfaces can be movably mounted to the proximal section of the instrument chassis. Surgical instruments can be mounted at the proximal end to the instrument interface. Surgical instruments can be mounted at its proximal end to the instrument interface. The interface drives movable components in the surgical instrument as described in U.S. Pat. No. 6,491,701, which is incorporated by reference herein, in its entirety. The interface drives the instrument in a similar way. The surgical instruments are also movably coupled to the distal section of the chassis. The instrument interfaces are mounted to the proximal section of the chassis such that rotational and linear motion is permitted. Specifically, an instrument interface mounting or a flexible instrument shaft permits a pitch motion of the instrument interfaces relative to the chassis, a yaw motion of the instrument interfaces relative to the chassis and an insertion sliding motion of the instrument interfaces relative to the chassis. The system can function in a manner similar to the manner in which chopsticks operate, in that small motions at the proximal end of the tool, near a pivot location, can correspond to larger motions at the distal end of the tool for manipulating objects.

An actuation system operates the components of instrument, such as an end effector and various wrist joints. An actuation system operates the components of instrument, such as an end effector and various wrist joints. The actuation systems can include motors, actuators, drive systems, control systems, and other components for effecting controlling the instruments. An interface actuation system controls the movement of the instrument with respect to the chassis, and an interface actuation system controls the movement of the instrument with respect to the chassis. The surgical system can be configured to manipulate one, two, or more instruments.

Some telesurgical systems use a surgical instrument coupled to a manipulator arm and to an insertion linkage system that constrained motion of the surgical instrument about a remote center of motion aligned along the shaft of the surgical instrument and coincident with a patient entry point, such as an entry incision. Further details of these methods and systems are described in U.S. Pat. Nos. 5,817,084 and 6,441,577, which are incorporated by reference herein in their entirety.

Actuators can be operably coupled to interface discs. A more detailed description of the interface discs and their function in driving a predetermined motion in an attached surgical instrument is fully described, for example, in U.S. Pat. No. 7,963,913, filed Dec. 10, 2006, disclosing "Instrument Interface of Robotic Surgical System," which is incorporated by reference herein in its entirety.

Various embodiments of surgical instruments, end effectors, and wrist mechanisms are explained in detail in U.S. Pat. Nos. 5,792,135; 6,331,181; and 6,817,974, which are incorporated by reference herein in their entirety.

Switching from Robotically-Assisted Surgery to Manual Surgery

One drawback of using robotically-assisted surgery is that instruments may need to be quickly removed when there is bleeding. Conventional surgical techniques may be required to find the source of the bleed, and close the bleed, before the rest of the surgical procedure can be performed. This can be difficult to practice, as it can be difficult to pre-program when a bleed will occur.

In one aspect of the present disclosure, one or more of the tissues, organs, or organ blocks includes a porcine ureter and/or one or more blood vessels selected from the group consisting of the abdominal aorta, the iliac arteries, and mesenteric vessels. The perfusion tubes discussed above perfuse real and/or simulated blood through one or more actual or simulated blood vessels/ureters. In this manner, the cassette can be used in methods of simulating vessel sealing exercises. In one embodiment, the surgeon cuts the vessel during the simulated surgery, and then has to repair the cut vessel. In another embodiment, one or more blood vessels in the surgical system is cut before surgery, but a clot is present, and the clot impedes the flow of blood. Once the clot is dissolved, the cut vessel "bleeds," and the physician has to repair the cut. The surgeon can seal the cut vessel, for example, using sutures, staples, and/or electrocautery.

In one aspect, animal blood, human blood, or the artificial blood compositions described herein is clotted using a clotting agent, and the clot is present in the vessel. The clot is dissolved during the simulated surgical procedure when the blood compositions, which, in this embodiment, contain an anti-clotting agent, are in sufficient contact with the clot to dissolve the clot. In another aspect of the disclosure, an anti-clotting agent is introduced, for example, into an IV bag, to cause the clot to dissolve.

When the clot dissolves, the surgeon using a telesurgical apparatus either has to fix the resulting bleeding using the telesurgical apparatus, or remove the apparatus from the patient, and go in manually to stop the bleeding.

Accordingly, in this embodiment, the simulated surgical systems can provide a more realistic experience than those in which there is never the possibility of simulating bleeding.

CONCLUSION

Shorter workweeks for residents, and increasing emphasis on OR efficiency, have dramatically diminished the available teaching time in the OR. In addition, the increasing number of legal litigations and complexity of cases have reduced faculty's ability to assist residents in the OR. In this scenario, simulation training has evolved as an important component of surgical education. We aimed to design a simulation model for laparoscopic and/or robotic colorectal surgery. Most of the simulation programs of laparoscopic training are focused on teaching basic laparoscopic skills. Box-lap trainers provide a relatively easy and cheap simulation model to acquire basic psychomotor skills needed to perform minimally invasive surgery, and remain an interesting tool for novice learners. In contrast to box-trainers, virtual-reality simulators have the capacity to train both basic skills and simulate full procedural surgical tasks.

Residents who receive virtual-reality training tend to make fewer errors and have higher economy of movements during a laparoscopic or robotic operation, as compared to residents without such training. However, their ability to train in more complex laparoscopic operations, such as colorectal procedures, is limited.

Since telesurgery is a new and evolving technology, there is also a significant demand for training established surgeons wanting to add this technology to their practice.

The use of cadavers represents the only "true" anatomy simulator currently, with the highest possible fidelity available to practice entire operations. Nevertheless, their cost, availability, tissue compliance, infection risk, and inability to simulate complications such as bleeding outweigh the advantages of cadaver models. Live animal models, on the other hand, provide access to a wide variety of procedures and allow training in realistic conditions. Porcine models, in fact, have proven to be an adequate tool to learn complex laparoscopic procedures. Drawbacks of using live porcine models include anatomical differences with humans, and high costs due to their housing and handling requirements. In addition, they are not universally available because of ethical or national legal restrictions.

The porcine tissue block simulator described herein has a similar surgical anatomy as compared to humans, and can be mounted in a space comparable to a human abdominal cavity, and it can be perfused with artificial blood, offering a valuable training tool.

Surgical training generally occurs on individual basis. In practice, however, operations are conducted by a multidisciplinary team in the OR. Simulated OR environments offer training in both technical skills and teamwork, promoting cooperation and reducing the number of communication errors. While teamwork-based training has been well recognized in emergency and trauma procedures, team simulation has not been advocated for laparoscopic surgery. With the model described herein set up in the simulated OR, it is possible to train the complete surgical team: surgeon (performing the operation), assistants (camera, retraction maneuvers), and nurses (knowledge of instrumental usage during different steps of the operation).

Surgical simulation is expensive and its cost constitutes a barrier for the universal embracement of simulation in surgical training programs. In fact, simulation remains an uncommon component of surgical education in low- and middle-income countries.

In this example, the model includes a porcine tissue block mounted in a human mannequin covered with an artificial abdominal wall, and perfused with artificial blood, which all represent very low expenses. In other embodiments, rather than a mannequin, the cassettes are mounted in a base tub adapted to contain the cassettes and simulate human abdominal dimensions. Cost effectiveness and return-on investment studies of surgical simulation training are needed to convince hospital and university administrators to invest in simulation. In conclusion, the models described herein represents a promising simulator to train surgeons for laparoscopic and/or robotic colorectal, pelvic, bladder, and uterine surgeries.

All references referred to herein are hereby incorporated by reference for all purposes.

Many modifications and other embodiments of the invention will come to the mind of one skilled in the art having the benefit of the teachings presented in the foregoing descriptions and the associated drawings. Therefore, it is to be understood that the inventive concepts described herein are not to be limited to the specific embodiments disclosed, and that the modifications and embodiments are intended to be included within the scope of the dependent claims.

While certain exemplary embodiments of the inventive concept have been described and shown in the accompanying drawings, it is to be understood that such embodiments are merely illustrative of and not restrictive, and that the embodiments of the inventive concept not be limited to the specific constructions and arrangements shown and described, since various other modifications may occur to those ordinarily skilled in the art.

The invention claimed is:

1. A support structure configured to support a colorectal tissue model for use in simulating colorectal surgery, comprising:
    a) a caudal end and a cephalad end, and right and left walls,
    b) a suspended support at or near the caudal end connected to both of the right and left walls, wherein the suspended support is configured to suspend tissue relative to the right and left walls, and
    c) a rim extending all or substantially all of a distance from the right and left walls, positioned to mimic a pelvic brim.

2. The support structure of claim 1, wherein the support structure is sized to mimic a human abdominal cavity from a diaphragm to a rectum of the human abdominal cavity.

3. The support structure of claim 1, wherein the support structure further comprises one or more holes along a bottom and/or the right and left walls of the support structure.

4. The support structure of claim 1, wherein the support structure further comprises d) a U-shaped canal at or near the caudal end, wherein open ends of the U-shaped canal are configured to be brought together to compress tissue supported by the U-shaped canal.

5. A model configured for use in simulated laparoscopic and/or robotically-assisted pelvic, bladder, uterine, and colon surgeries, comprising:
    a) a support structure adapted to fit inside a mannequin to simulate an abdominal cavity,
    b) a portion of pig belly thinned out to between 0.5 and 2" in thickness, covering all or substantially all of a bottom and side walls of the support structure, wherein the portion of pig belly is adhered to the support structure,
    c) a circumferential layering of muscle tissue around a tissue block comprising all or part of a rectum, bladder, urethra and uterus, layered onto a U-shaped canal of the support structure, wherein open ends of the "U" are brought together to compress the tissue in the tissue block,
    d) a descending colon anchored to the portion of pig belly, and e) muscle tissue, attached to the support structure, draped down onto the portion of pig belly between a suspended support and the U-shaped canal.

6. The model of claim 5, wherein an aorta runs down a middle of the portion of pig belly, and is positioned, between right and left lateral walls of the support structure, and wherein the aorta is bifurcated above a simulated pelvic brim to form a left and right iliac artery near a base of the aorta.

7. The model of claim 6, wherein balloons are placed into one or more of the aorta and left and right iliac arteries.

8. The model of claim 6, further comprising one or more of the following:
f) a pair of ureters or other bio-based vessels secured in an anatomically correct position on the portion of pork belly such that the pair of ureters or other bio-based vessels runs just lateral to the aorta on each side, looping over iliac vessels on each side, and terminating with the iliac arteries laterally,
g) a Component 1, comprising biological tubing connected to a "Y" adaptor with three tubes, and adhered, through the aorta and into mesentery, on the descending colon,
h) a portion of small bowel comprising two ends, and comprising mesentery, secured to the pork belly, connected at one of the ends to an ascending colon, and at the other end, connecting to the pork belly to the left of the aorta,
i) sigmoid bowel mesentery brought down to the aorta, or
j) one or more intraluminal balloons placed inside the aorta, to allow for simulation of pulsation of the aorta as the one or more balloons are inflated and deflated.

9. The model of claim 8, wherein the model comprises the Component 1, further comprising a perfusion tube with two ends, coming up through the aorta and connected at one of the ends to one of the three tubes in Component 1.

10. The model of claim 9, wherein the perfusion tube is at its other end connected to a quick-connect adaptor adapted for being connected to a pump and/or IV.

11. The model of claim 10, further comprising an IV bag filled with simulated blood, connected to one end of the perfusion tube.

12. The model of claim 8, wherein an aorta runs down a middle of the portion of pig belly, and wherein the model comprises one or more intraluminal balloons placed inside the aorta, further comprising a means for inflating and deflating the one or more balloons.

13. The model of claim 5, wherein:
a) the support structure is sized to mimic a human abdominal cavity from a diaphragm to a rectum of the human abdominal cavity,
b) the support structure further comprises one or more holes along the bottom and/or the sides of the support structure, or
c) the support structure is formed of a thermoplastic material.

14. The model of claim 5, further comprising a cassette adapted to be attached to the support structure, wherein the cassette comprises a second support structure and one or more of a gallbladder, a liver, a kidney, or a blood vessel.

15. A model for simulating colorectal surgery, comprising:
a) a support structure adapted to fit inside a mannequin to simulate an abdominal cavity, and
b) a simulated transverse colon, wherein the simulated transverse colon is prepared by inverting all or a portion of a porcine left colon, and adhering all or a portion of a porcine left colon to the inverted porcine left colon to form a simulated transverse colon.

16. The model of claim 15, wherein the support structure comprises:
i) a caudal end and a cephalad end, and right and left lateral walls,
ii) a U-shaped canal at or near the caudal end,
iii) a suspended support at or near the caudal end above the U-shaped canal, connected to both of the right and left walls; and
iv) a rim, extending all or substantially all of a distance from the right and left walls, positioned to mimic a pelvic brim.

17. The model of claim 16, further comprising:
c) a portion of pig belly thinned out to between 0.5 and 2" in thickness, covering all or substantially all of a bottom and the right and left walls of the support structure, wherein the portion of pig belly is adhered to the support structure,
wherein an aorta runs down a middle of the portion of pig belly, and is positioned between right and left lateral walls, and wherein the aorta is bifurcated above the simulated pelvic brim.

18. The model of claim 17, further comprising one or more of
d) a pair of ureters placed on the pig belly, each within one to two inches of each side of the aorta, extending all or substantially all of an entire length of the aorta and along its respective branches (i.e., each ureter follows the bifurcation), and
e) a circumferential layering of muscle and rectum, which comprises at least 50% of the original mesentery from the animal from which it was obtained, laid into the canal and physically or chemically adhered into place onto the pig belly at the caudal end of the support structure, wherein mesentery is adhered to the portion of pig belly and to the aorta.

19. The model of claim 17, further comprising:
f) a left and right colon, and one or more of:
g) Component 1, comprising biological tubing connected to a "Y" adaptor with three tubes, and adhered, through the aorta and into mesentery, on the left colon, and
h) Component 2, comprising biological tubing, connected to a "Y" adaptor with three tubes, and adhered, through the aorta and into the mesentery, on the right colon.

20. The model of claim 19, comprising a Component 1, further comprising:
i) a first perfusion tube with two ends, coming up through the aorta and connected at one of the ends to one of the three tubes in Component 1, and
j) a Component 2, further comprising a second perfusion tube with two ends, coming up through the aorta, and connected at one of the ends to one of the three tubes in Component 2, wherein both of the perfusion tubes are connected at their other end to quick-connect or other suitable adaptors adapted for being connected to a pump and/or IV, so as to perfuse real or fake blood through the tubes.

21. The model of claim 20, further comprising:
k) a spleen or portion thereof adhered to the portion of pig belly at an anatomically correct position, and
l) a rectum, wherein one of the tubes in the Y-connector of Component 1 goes to the rectum and another tube toward the spleen, and one of the tubes in the Y-connector of Component 2 comes out of the aorta on a side not adjacent to the support structure, with the three tubes going to the spleen and connecting to the other tube from Component 1 that exited the spleen, wherein the third tube goes into the mesentery along the right colon, loops back, and is connected to the aorta.

22. The model of claim 17, further comprising one or more of:
   m) a portion of tissue resembling a duodenum adhered to the pig belly toward the right of the aorta,
   n) a portion of small bowel comprising two ends, and comprising mesentery, secured to the pig belly, connecting to the pork belly to the left of the aorta, and
   o) a portion of pig abdominal wall muscle adhered to the caudal end of the pig belly, and passed over and held in place on the suspended support,
   p) one or more intraluminal balloons placed inside the aorta, to allow for simulation of pulsation of the aorta as the one or more balloons are inflated and deflated,
   q) all or a portion of a liver attached to the pig belly in an anatomically correct position,
   r) a portion of a descending colon that comes up through the pelvis, past the spleen, and
   s) a piece of bowel adhered to the right wall to simulate an ascending bowel.

23. The model of claim 20, further comprising an IV bag filled with simulated blood, connected to one end of one or both of first and second perfusion tubes.

24. The model of claim 15, wherein the model comprises one or more intraluminal balloons, further comprising a means for inflating and deflating the one or more balloons.

25. The model of claim 15, further comprising a section of the left colon of the pig, wherein the section of the left colon is used to mimic the ascending, or right, colon that would be present in the human anatomy.

* * * * *